United States Patent
Noh et al.

(10) Patent No.: US 9,385,906 B2
(45) Date of Patent: *Jul. 5, 2016

(54) METHOD OF TRANSMITTING REFERENCE SIGNALS IN A WIRELESS COMMUNICATION HAVING MULTIPLE ANTENNAS

(71) Applicant: LG ELECTRONICS INC., Seoul (KR)

(72) Inventors: Yu Jin Noh, Anyang-si (KR); Dae Won Lee, Anyang-si (KR); Bong Hoe Kim, Anyang-si (KR); Ki Jun Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 156 days.

This patent is subject to a terminal disclaimer.

(21) Appl. No.: 13/857,962

(22) Filed: Apr. 5, 2013

(65) Prior Publication Data
US 2013/0230123 A1 Sep. 5, 2013

Related U.S. Application Data

(63) Continuation of application No. 12/567,665, filed on Sep. 25, 2009, now Pat. No. 8,428,018.

(60) Provisional application No. 61/100,271, filed on Sep. 26, 2008.

(30) Foreign Application Priority Data

Dec. 24, 2008 (KR) ........................ 10-2008-0132995

(51) Int. Cl.
H04L 27/26 (2006.01)
H04B 7/04 (2006.01)
(Continued)

(52) U.S. Cl.
CPC .......... *H04L 27/2627* (2013.01); *H04B 7/0452* (2013.01); *H04B 7/0617* (2013.01); *H04L 5/0023* (2013.01); *H04L 5/0051* (2013.01); *H04L 5/0092* (2013.01); *H04L 25/03343* (2013.01); *H04L 5/0053* (2013.01); *H04L 25/0204* (2013.01); *H04L 25/0226* (2013.01);
(Continued)

(58) Field of Classification Search
None
See application file for complete search history.

(56) References Cited

U.S. PATENT DOCUMENTS 5,914,933 A * 6/1999 Cimini et al. ................. 370/208
6,937,582 B1 * 8/2005 Kronestedt ................... 370/329
(Continued)

FOREIGN PATENT DOCUMENTS

WO 2008105267 9/2008

OTHER PUBLICATIONS

U.S. Appl. No. 61/097,824 to Nam et al., filed Sep. 17, 2008.*
(Continued)

*Primary Examiner* — Dung B Huynh
(74) *Attorney, Agent, or Firm* — Lee, Hong, Degerman, Kang & Walmey; Jonathan Kang; Michael Monaco

(57) ABSTRACT

A method of transmitting signals by a transmitting end in a wireless communication system comprises sharing control information related to reference signal with a receiving end; generating one or more precoded reference signals considering a given rank; allocating the one or more precoded reference signals to have a specific pattern within a subframe, wherein the specific pattern is varied depending on the control information; and transmitting the subframe through multiple antennas to the receiving end.

9 Claims, 27 Drawing Sheets

(51) Int. Cl.
*H04B 7/06* (2006.01)
*H04L 5/00* (2006.01)
*H04L 25/03* (2006.01)
*H04L 25/02* (2006.01)

(52) U.S. Cl.
CPC ....... *H04L 25/0248* (2013.01); *H04L 25/03866* (2013.01); *H04L 2025/03414* (2013.01); *H04L 2025/03426* (2013.01)

(56) References Cited

U.S. PATENT DOCUMENTS

| | | | |
|---|---|---|---|
| 6,990,318 B2 | 1/2006 | Horisaki | |
| 7,532,675 B2 | 5/2009 | Li et al. | |
| 7,693,032 B2 | 4/2010 | Li et al. | |
| 7,751,304 B2 | 7/2010 | Ro et al. | |
| 8,000,221 B2 | 8/2011 | Walton et al. | |
| 8,085,875 B2 | 12/2011 | Gore et al. | |
| 2005/0243939 A1 | 11/2005 | Jung et al. | |
| 2005/0249319 A1* | 11/2005 | Suh et al. | 375/347 |
| 2005/0286408 A1 | 12/2005 | Jin et al. | |
| 2006/0013186 A1 | 1/2006 | Agrawal et al. | |
| 2007/0070944 A1 | 3/2007 | Rinne et al. | |
| 2007/0104174 A1 | 5/2007 | Nystrom et al. | |
| 2007/0153834 A1* | 7/2007 | Qu et al. | 370/478 |
| 2007/0195899 A1 | 8/2007 | Bhushan et al. | |
| 2007/0195908 A1 | 8/2007 | Attar et al. | |
| 2008/0037686 A1* | 2/2008 | Akita et al. | 375/302 |
| 2008/0043708 A1* | 2/2008 | Muharemovic | H04L 5/0007 370/348 |
| 2008/0080472 A1* | 4/2008 | Bertrand et al. | 370/344 |
| 2008/0159186 A1 | 7/2008 | Steer | |
| 2008/0181191 A1* | 7/2008 | Hillery et al. | 370/339 |
| 2008/0205348 A1* | 8/2008 | Malladi | H04L 1/1607 370/335 |
| 2008/0214126 A1* | 9/2008 | Holt | 455/93 |
| 2008/0232234 A1* | 9/2008 | McCoy et al. | 370/203 |
| 2008/0273614 A1* | 11/2008 | Heegard et al. | 375/260 |
| 2008/0293424 A1* | 11/2008 | Cho et al. | 455/450 |
| 2009/0003480 A1* | 1/2009 | Chen et al. | 375/260 |
| 2009/0041150 A1 | 2/2009 | Tsai et al. | |
| 2009/0073955 A1* | 3/2009 | Malladi | H04L 5/0051 370/349 |
| 2009/0074099 A1 | 3/2009 | Zheng et al. | |
| 2009/0122857 A1* | 5/2009 | Li et al. | 375/239 |
| 2009/0129259 A1* | 5/2009 | Malladi | H04B 7/0417 370/210 |
| 2009/0131110 A1 | 5/2009 | Balachandran et al. | |
| 2009/0201863 A1* | 8/2009 | Pi | 370/329 |
| 2009/0245187 A1* | 10/2009 | Nam et al. | 370/329 |
| 2009/0252077 A1* | 10/2009 | Khandekar et al. | 370/312 |
| 2009/0262695 A1* | 10/2009 | Chen et al. | 370/329 |
| 2009/0262856 A1* | 10/2009 | Onggosanusi et al. | 375/267 |
| 2009/0274103 A1 | 11/2009 | Yang et al. | |
| 2009/0274174 A1 | 11/2009 | Hwang et al. | |
| 2010/0034152 A1* | 2/2010 | Imamura | 370/329 |
| 2010/0034312 A1* | 2/2010 | Muharemovic et al. | 375/267 |
| 2010/0041350 A1* | 2/2010 | Zhang et al. | 455/101 |
| 2010/0061360 A1* | 3/2010 | Chen et al. | 370/342 |
| 2010/0067512 A1* | 3/2010 | Nam et al. | 370/342 |
| 2010/0080154 A1 | 4/2010 | Noh et al. | |
| 2010/0103906 A1 | 4/2010 | Montojo et al. | |
| 2010/0118855 A1* | 5/2010 | Malladi | H04J 13/0062 370/342 |
| 2010/0128675 A1* | 5/2010 | Kishiyama et al. | 370/328 |
| 2010/0173639 A1* | 7/2010 | Li et al. | 455/450 |
| 2010/0182975 A1 | 7/2010 | Malladi et al. | |
| 2010/0190506 A1 | 7/2010 | To et al. | |
| 2010/0220685 A1 | 9/2010 | Suda et al. | |
| 2010/0238877 A1 | 9/2010 | Nam et al. | |
| 2010/0260159 A1* | 10/2010 | Zhang et al. | 370/338 |
| 2010/0272055 A1 | 10/2010 | Noh et al. | |
| 2011/0013617 A1 | 1/2011 | Ito | |
| 2011/0075760 A1* | 3/2011 | Ogawa et al. | 375/296 |
| 2011/0110323 A1 | 5/2011 | Kim et al. | |
| 2011/0134867 A1* | 6/2011 | Lee et al. | 370/329 |
| 2011/0164661 A1* | 7/2011 | Frenger et al. | 375/211 |
| 2011/0170629 A1* | 7/2011 | Lee et al. | 375/295 |
| 2011/0176502 A1* | 7/2011 | Chung et al. | 370/329 |
| 2012/0250608 A1* | 10/2012 | Wang et al. | 370/328 |

OTHER PUBLICATIONS

U.S. Appl. No. 61/095,849 to Chen et al., filed Sep. 10, 2008.*
Texas Instruments, "Uplink SU-MIMO for E-UTRA," 3GPP TSG RAN WG1 53bis, R1-082707, Jun. 2008, 6 pages.
3rd Generation Partnership Project (3GPP), "Technical Specification Group Radio Access Network; Evolved Universal Terrestrial Radio Access (E-UTRA); Physical Channels and Modulation (Release 8)," 3GPP TS 36.211 V8.4.0, Sep. 2008, 78 pages.

* cited by examiner

Rank 1

Rank 2

Rank 3

Rank 4

Rank 1

Rank 2

Rank 3

Rank 4

Rank 1     M = 1

Rank3  M = 3            M = 4

FIG. 15D

Rank4

(a) Rank2

(b) Rank4

Rank2

Rank4

FIG. 20

METHOD OF TRANSMITTING REFERENCE SIGNALS IN A WIRELESS COMMUNICATION HAVING MULTIPLE ANTENNAS

CROSS REFERENCE TO RELATED APPLICATIONS

This application is a continuation of U.S. application Ser. No. 12/567,665, filed on Sep. 25, 2009, now U.S. Pat. No. 8,428,018, which claims the benefit of U.S. Provisional Application No. 61/100,271, filed on Sep. 26, 2008, and also claims the benefit of earlier filing date and right of priority to Korean Patent Application No. 10-2008-0132995, filed on Dec. 24, 2008, the contents of which are all hereby incorporated by reference herein in their entirety.

BACKGROUND OF THE INVENTION

1. Field of the Invention

The present invention relates to a method of performing communication in a wireless communication system, and more particularly, to a method of transmitting reference signals in a wireless communication system having multiple antennas.

2. Discussion of the Related Art

A 3rd Generation Partnership Project (3GPP) wireless communication system based on the Wideband Code Division Multiple Access (WCDMA) radio access technology has been widely developed. A High Speed Downlink Packet Access (HSDPA) that can be defined as a first evolution stage of the WCDMA provides the 3GPP with a radio access technology having high competitiveness in the mid-term future.

An example of the radio access technology for providing high competitiveness in the long-term future includes an Evolved Universal Mobile Telecommunications System (E-UMTS). The E-UMTS is an evolved version of the conventional WCDMA UMTS, and its basic standardization is in progress under the 3GPP. The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network."

The E-UMTS includes a User Equipment (UE), a base station, and an Access Gateway (AG) which is located at an end of a network (E-UTRAN) and connected to an external network. Generally, the base station can simultaneously transmit multiple data streams for a broadcast service, a multicast service and/or a unicast service. In the LTE system, an orthogonal frequency divisional multiplexing (OFDM) scheme and a multiple-input multiple-output (MIMO) scheme are used to downlink-transmit various services.

The OFDM scheme represents a high-speed data downlink access system. The OFDM scheme has an advantageous of high spectral efficiency in that the whole spectrum as allocated can be used by all base stations. For OFDM modulation, a transmission band is divided into a plurality of orthogonal subcarriers in a frequency domain and a plurality of symbols in a time domain. Since the OFDM scheme divides the transmission band into a plurality of subcarriers, a bandwidth per subcarrier is reduced and a modulation time per carrier is increased. Since the plurality of subcarriers are transmitted in parallel, a transmission rate of digital data or symbols of a specific subcarrier is more lowered than that of a single carrier.

The MIMO scheme is used for a communication system with a plurality of transmitting and receiving antennas. The MIMO scheme can linearly increase channel capacity without additional increase of a frequency bandwidth as the number of transmitting and receiving antennas increases. Examples of the MIMO scheme include a spatial diversity scheme and a spatial multiplexing scheme, wherein the spatial diversity scheme can enhance transmission reliability using symbols which have passed through various channel paths, and the spatial multiplexing scheme is to increase a transmission rate by simultaneously transmitting respective data streams from the respective antennas using a plurality of transmitting antennas.

Also, the MIMO scheme can be divided into an open-loop MIMO scheme and a closed-loop MIMO scheme depending on whether a transmitter knows channel information. In the open-loop MIMO scheme, the transmitter does not know channel information. Examples of the open-loop MIMO scheme include PARC (per antenna rate control), PCBRC (per common basis rate control), BLAST (Bell Laboratories Layered Space Time), STTC (space time trellis code), random beamforming, etc. On the other hand, in the closed-loop MIMO scheme, the transmitter knows channel information. Throughput of the closed-loop MIMO scheme depends on how exactly the transmitter knows the channel information. Examples of the closed-loop MIMO scheme include PSRC (per stream rate control), TxAA (Transmit Antenna Array), etc.

The channel information means radio channel information (for example, attenuation, phase shift, or time delay, etc.) between a plurality of transmitting antennas and a plurality of receiving antennas. In the MIMO scheme, various stream paths exist in accordance with combination of a plurality of transmitting and receiving antennas. The MIMO scheme has fading characteristics that a channel status is irregularly changed in time/frequency domains depending on time due to multi-path time delay. Accordingly, a receiver obtains channel information through channel estimation. The channel estimation is to estimate channel information to recover a distorted transmission signal. For example, the channel estimation means that amplitude and reference phase of carriers are estimated. Namely, the channel estimation is to estimate frequency response of a radio interface or a radio channel.

An example of a channel estimation method includes a method of estimating a reference value based on reference signals (RS) of several base stations using a two-dimensional channel estimator. The reference signals (RS) mean symbols having no real data but having high output to assist carrier phase synchronization and acquisition of base station information. The transmitter and the receiver can perform channel estimation using such reference signals (RS). Channel estimation through the reference signals (RS) means that a channel is estimated through a symbol commonly known by the transmitter and the receiver and data are recovered using the estimated result. The reference signals (RS) are also referred to as pilots.

The MIMO scheme supports a time division duplexing (TDD) mode and a frequency division duplexing (FDD) mode. Since forward link transmission and reverse link transmission lie on the same frequency domain in the TDD mode, a forward link channel can be estimated from a reverse link channel by the reciprocity principle.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

In this respect, standardization of advanced technology of LTE is in progress under the 3rd Generation Partnership Project (3GPP). Herein, this technology will be referred to as "LTE-Advance" or "LTE-A." One of important differences between the LTE system and the LTE-A system is the number of antennas for transmission. Currently, the LTE system aims to support a single antenna. On the other hand, the LTE-A system aims to support multiple antennas that reach maximum four antennas. Accordingly, the LTE-A system should support transmission of reference signals for maximum four antennas. Particularly, in the LTE-A system, a method for supporting multi-user MIMO (MU-MIMO) is discussed.

SUMMARY OF THE INVENTION

Accordingly, the present invention is directed to a method of transmitting reference signals in a wireless communication system having multiple antennas, which substantially obviates one or more problems due to limitations and disadvantages of the related art.

An object of the present invention is to provide a method of efficiently transmitting reference signals in a wireless communication system having multiple antennas.

Another object of the present invention is to provide a method of flexibly controlling a pattern of reference signals depending on a communication condition.

Still another object of the present invention is to provide a signaling method for flexibly controlling a pattern of reference signals.

Further still another object of the present invention is to provide a method of flexibly controlling a pattern of reference signals to efficiently support SU-MIMO and/or MU-MIMO.

Further still another object of the present invention is to provide a signaling method for flexibly controlling a pattern of reference signals to efficiently support SU-MIMO and/or MU-MIMO.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting signals by a transmitting end in a wireless communication system comprises sharing control information related to reference signal with a receiving end; generating one or more precoded reference signals considering a given rank; allocating the one or more precoded reference signals to have a specific pattern within a subframe, wherein the specific pattern is varied depending on the control information; and transmitting the subframe through multiple antennas to the receiving end.

The control information may include information related to density or overhead of the one or more precoded reference signals.

The control information may include information related to a frequency interval of the one or more precoded reference signals. The frequency interval may include subcarrier spacing between the one or more precoded reference signals within one subframe or slot, and the one or more precoded reference signals may be staggered within the subframe or slot. The frequency interval may include subcarrier spacing between the one or more precoded reference signals within one orthogonal frequency division multiplexing (OFDM) symbol. The frequency interval may be 1, 2, 3 or 4 when the given rank is 1. The frequency interval may be 2, 3 or 4 when the given rank is 2.

The control information may include information indicating the given rank of the scheduled data streams for the UE receiving the control information.

The control information may include information indicating whether radio resources for one or more reference signals associated with other layers which do not correspond to scheduled data stream layers are punctured or not.

The control information may include information indicating whether radio resources for one or more reference signals associated with other layers which do not correspond to scheduled data stream layers can be used for transmitting scheduled data or not.

The control information may include information indicating whether radio resources for one or more reference signals associated with other layers which do not correspond to scheduled data stream layers are used by one or more another transmitting ends.

The control information may include information indicating whether a radio resource for the subframe has been allocated to a single user or multiple users. If the control information indicates that the radio resource for the subframe is allocated to multiple users, the one or more precoded reference signals may be multiplexed within the subframe considering reference signals of other user equipments to which the same radio resource is allocated. In this case, the control information may further include information required to multiplex the one or more precoded reference signals with the reference signals of other user equipment.

The one or more precoded reference signals may be multiplexed using a frequency division multiplexing mode, a code division multiplexing mode, or their combination.

The one or more precoded reference signals may be cyclic-shifted in a frequency domain or a time domain.

A specific multiple access schemes may be selectively used among two or more different multiple access schemes depending on the given rank.

The one or more precoded reference signals may be demodulation reference signals (DMRS).

According to the embodiments of the present invention, the following advantages can be obtained.

First of all, it is possible to efficiently transmit reference signals through multiple antennas in a wireless communication system.

Second, it is possible to flexibly control a pattern of reference signals depending on a communication condition.

Third, it is possible to flexibly control a pattern of reference signals to efficiently support SU-MIMO and/or MU-MIMO.

Finally, it is possible to signal for flexibly controlling a pattern of reference signals to efficiently support SU-MIMO and/or MU-MIMO.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15A to FIG. 15D are diagrams illustrating examples of reference signals allocated with regard to each rank value by a frequency division multiplexing (FDM) mode considering M factor in accordance with one embodiment of the present invention;

FIG. 18A to FIG. 18D are diagrams illustrating examples of reference signals allocated with regard to each rank value by a frequency division multiplexing (FDM) mode considering M factor in accordance with another embodiment of the present invention;

FIG. 20 is a diagram illustrating another example of reference signals allocated by a frequency division multiplexing (FDM) mode to implement MU MIMO in accordance with another embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

E-UTRAN and Protocol Stack

Figure 1:
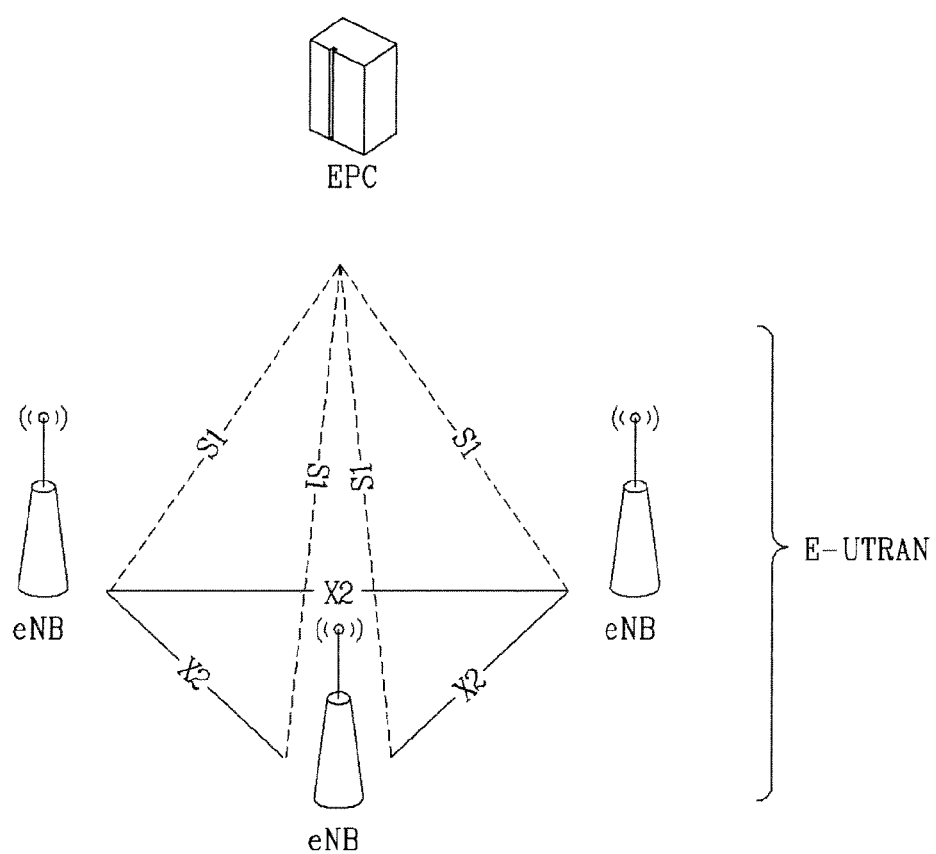
FIG. 1 is a schematic diagram illustrating an evolved universal terrestrial radio access network (E-UTRAN)

FIG. 1 is a schematic diagram illustrating a network structure of an evolved universal terrestrial radio access network (E-UTRAN) which is a mobile communication system to which one embodiment of the present invention is applied. The E-UTRAN system is a system evolving from the UTRAN system. The E-UTRAN includes base stations eNBs, which are connected with each other through X2 interface. The eNB is connected with a user equipment through a radio interface, and is connected with an evolved packet core (EPC) through S1 interface.

Figure 2A:
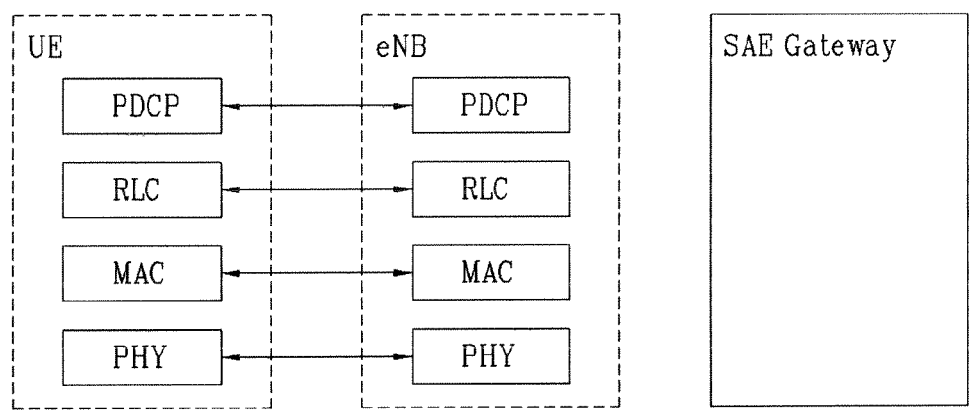
FIG. 2A and FIG. 2B are diagrams illustrating structures of a control plane and a user plane of a radio interface protocol between a user equipment (UE) and E-UTRAN.
Figure 2B:
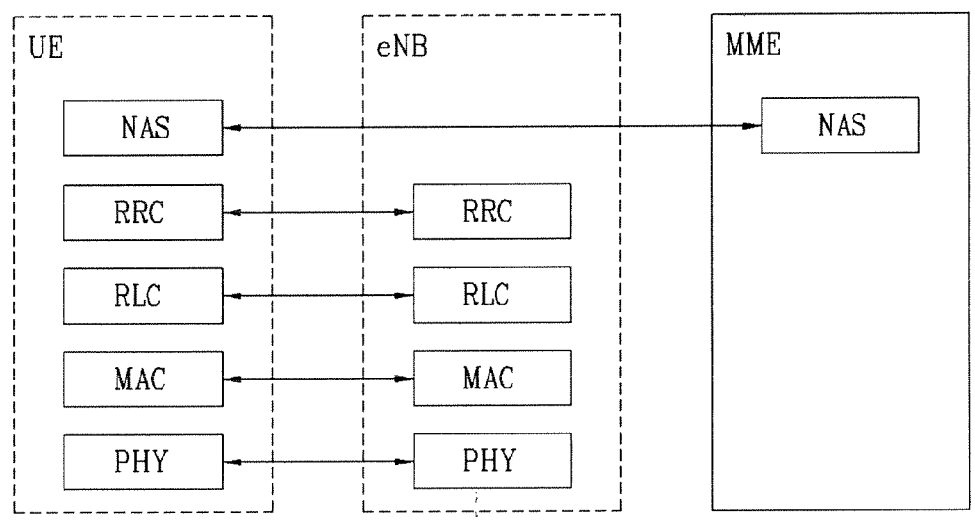

FIG. 2A and FIG. 2B are diagrams illustrating structures of a control plane and a user plane (U-plane) of a radio interface protocol between a user equipment (UE) and UTRAN (UMTS Terrestrial Radio Access Network) based on the 3GPP radio access network standardization. The radio interface protocol horizontally includes a physical layer, a data link layer and a network layer, and vertically includes a user plane for data information transfer and a control plane for signaling transfer. The protocol layers in FIG. 2A and FIG. 2B can be classified into L1 (first layer), L2 (second layer), and L3 (third layer) based on three lower layers of the open system interconnection (OSI) standard model widely known in the communications systems.

The control plane means a passageway where control messages are transmitted, wherein the control messages are used in the user equipment and the network to manage call. The user plane means a passageway where data generated in an application layer, for example, voice data or Internet packet data are transmitted. Hereinafter, respective layers of the control plane and the user plane of the radio protocol will be described.

The physical layer as the first layer provides an information transfer service to an upper layer using a physical channel. The physical layer (PHY) is connected to a medium access control (hereinafter, abbreviated as 'MAC') layer above the physical layer via a transport channel. Data are transferred between the medium access control layer and the physical layer via the transport channel. The transport channel is divided into a dedicated transport channel and a common transport channel depending on channel sharing. Also, data are transferred between different physical layers, and more particularly, between one physical layer of a transmitting side and the other physical layer of a receiving side via the physical channel. The physical channel is modulated in accordance with an orthogonal frequency division multiplexing (OFDM) scheme, and uses time and frequency as radio resources.

Several layers exist in the second layer. A medium access control (MAC) layer of the second layer serves to map various logical channels with various transport channels. Also, the MAC layer performs multiplexing for mapping several logical channels with one transport channel. The MAC layer is connected with a radio link control (RLC) layer corresponding to its upper layer through the logical channel. The logical channel is divided into a control channel and a traffic channel depending on types of transmitted information, wherein the control channel transmits information of the control plane and the traffic channel transmits information of the user plane.

The RLC layer of the second layer serves to perform segmentation and concatenation of data received from its upper layer to control a size of the data so that the lower layer transmits the data to a radio interval. Also, the RLC layer of the second layer provides three action modes, i.e., a transparent mode (TM), an unacknowledged mode (UM), and an acknowledged mode (AM) to ensure various quality of services (QoS) required by each radio bearer (RB). In particular, the AM RLC layer performs a retransmission function through automatic repeat and request (ARQ) for reliable data transmission.

In order to effectively transmit data using IP packets (e.g., IPv4 or IPv6) within a radio-communication interface having a narrow bandwidth, a PDCP (packet data convergence protocol) layer of the second layer (L2) performs header compression to reduce the size of IP packet header having a relatively large size and unnecessary control information. The header compression is to increase transmission efficiency of the radio-communication interface by allowing a packet header of data to transmit necessary information only. Also, in the LTE system, the PDCP layer performs a security function. The security function includes a ciphering function preventing the third party from performing data monitoring and an integrity protection function preventing the third party from performing data manipulation.

A radio resource control (hereinafter, abbreviated as 'RRC') layer located on a lowest part of the third layer is defined in the control plane only and is associated with configuration, re-configuration and release of radio bearer (hereinafter, abbreviated as 'RB') where the RB is in charge of controlling the logical, transport and physical channels. To this end, the RRC layer allows the user equipment and the network to exchange RRC message with each other. If the RRC layer of the user equipment is RRC connected with the RRC layer of the radio network, the user equipment is in RRC connected mode. If not so, the user equipment is in RRC idle mode.

In this case, the RB means a service or logical path provided by the second layer for the data transfer between the user equipment and the UTRAN. Generally, establishing RB means that features of a radio protocol layer and channel required for a specific service are defined and their detailed parameters and action methods will be established. The RB is divided into a signaling RB (SRB) and a data RB (DRB). The SRB is used as a path for transmitting RRC message in a control plane, and the DRB is used as a path for transmitting user data in a user plane.

A non-access stratum (NAS) layer located above the RRC layer performs functions such as session management and mobility management.

One cell constituting eNB is established at one of bandwidths of 1.25, 2.5, 5, 10, and 20 Mhz and provides a downlink or uplink transmission service to several user equipments. At this time, different cells can be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Modeling of MIMO System

Figure 3:
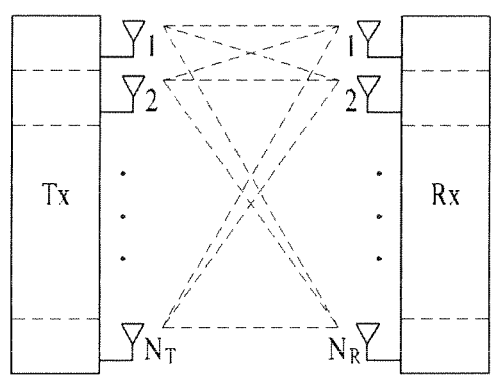
FIG. 3 is a schematic diagram illustrating antennas of a multiple input multiple output (MIMO) system.

FIG. 3 is a schematic diagram illustrating a wireless communication system having multiple antennas. As illustrated in FIG. 3, if the number of transmitting antennas is increased to $N_T$ and the number of receiving antennas is increased to $N_R$, theoretical channel transmission capacity is increased in proportional to the number of antennas unlike the case that a plurality of antennas are used only in either a transmitter or a receiver. Accordingly, it is possible to improve a transmission rate and remarkably improve frequency efficiency. As channel transmission capacity increases, the transmission rate can theoretically increase as much as a value obtained by multiplying a maximum transmission rate $R_o$ by a rate increase rate $R_i$.

$$R_i = \min(N_T, N_R) \qquad \text{[Equation 1]}$$

For example, in a MIMO communication system that uses four transmitting antennas and four receiving antennas, a transmission rate of four times more than that of a single antenna system can be obtained. Various technologies for improving a substantial data transmission rate have been studied after the theoretical capacity of a MIMO system has proved in the mid 90's. Also, several technologies have been reflected upon the standard of various wireless communications such as 3rd generation mobile communication and next generation wireless LAN.

Upon review of the trend of recent studies related to multiple antennas, it is noted that active studies are ongoing in view of various aspects such as information theoretical studies related to calculation of multi-antenna communication capacity under various channel environments and multiple access environments, studies for measuring a radio channel and forming a pattern in a MIMO system, and studies of the space time signal processing technology for improving transmission reliability and a transmission rate.

A communication method in a MIMO system will be described in more detail with reference to mathematical modeling. It is assumed that $N_T$ number of transmitting antennas and $N_R$ number of receiving antennas exist in the MIMO system.

Upon review of a transmitting signal, when $N_T$ number of transmitting antennas exist, the number of maximum available information for transmission is $N_T$. The transmission information can be expressed as follows.

$$s = [s_0, s_2, \ldots, s_{N_T}]^T$$

Each transmission information $s_1, s_2, \ldots, s_{N_T}$ can have its own transmission power. Supposing that each transmission power is $P_1, P_2, \ldots, P_{N_T}$, transmission information of which transmission power has been controlled can be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Also, $\hat{S}$ can be expressed as follows using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

It is considered that $N_T$ number of transmitting signals $x_1$, $x_2, \ldots, x_{N_T}$ are generated as a weight matrix W is applied to the information vector $\hat{s}$ of which transmission power has been controlled. In this case, the weight matrix W serves to appropriately distribute transmission information to each antenna depending on a transport channel status. $x_1, x_2, \ldots, x_{N_T}$ can be expressed as follows using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, $w_{ij}$ means a weight value between the i-th transmitting antenna and the j-th information. W is also referred to as a precoding matrix.

When $N_R$ number of receiving antennas exist, receiving signals $y_1, y_2, \ldots, y_{N_R}$ of each antenna can be expressed as follows using a vector.

$$y = [y_1, y_2, \ldots, y_{N_R}]^T \quad \text{[Equation 6]}$$

When channel modeling is performed in the multi-antenna wireless communication system, the channel can be classified depending on transmitting and receiving antenna indexes. A channel that passes from the transmitting antenna j to the receiving antenna i will be expressed as $h_{ij}$. It is noted that the receiving antenna index is prior to the transmitting antenna index.

Figure 4:
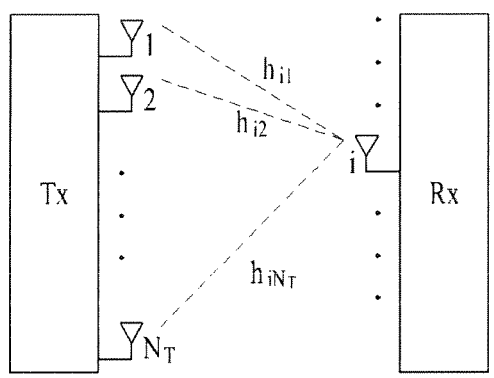
FIG. 4 is a diagram illustrating a channel from transmitting antennas $N_T$ to a receiving antenna i.

FIG. 4 shows channels from $N_T$ number of transmitting antennas to the receiving antenna i. The channels can be expressed in a vector and matrix type. In FIG. 4, the channels arrived from a total of $N_T$ number of transmitting antennas to the receiving antenna i can be expressed as follows.

$$h_i^T = [h_{i1}, h_{i2}, \ldots, h_{iN_T}] \quad \text{[Equation 7]}$$

Accordingly, all channels arrived from $N_T$ number of transmitting antennas to $N_R$ number of receiving antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

Additive white Gaussian noise (AWGN) is added to a real channel after passing through a channel matrix H. AWGN $n_1$, $n_2, \ldots, n_{N_R}$ added to each of the $N_R$ number of receiving antennas can be expressed as follows.

$$n = [n_1, n_2, \ldots, n_{N_R}]^T \quad \text{[Equation 9]}$$

The receiving signals can be expressed as follows through the aforementioned equation modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The aforementioned description is based on that the multi-antenna communication system is applied to a single user. However, the multi-antenna communication system may be applied to a plurality of users, whereby multiuser diversity can be obtained. This will be described as follows.

A fading channel is well known as a main factor that deteriorates throughput of the wireless communication system. Channel gain is varied depending on time, frequency and space, and throughput is remarkably deteriorated as a channel gain value is low. Diversity which is one of methods that can resolve fading uses the fact that it is not likely that several independent channels all have low gain. Various diversity schemes can be provided, and an example of the various diversity schemes includes multiuser diversity.

When several users are within a cell, channel gain of each user is independent in view of probability. Accordingly, it is not likely that channel gains of the users are all low.

According to the information theory, when the transmission power of the base station is sufficient and several users are within a cell, all channels may be allocated to a user having the highest channel gain, whereby total capacity of the channels can be maximized. Multiuser diversity can be divided into three types as follows.

First of all, temporal multiuser diversity is to allocate a channel to a user having the highest gain value when the channel is varied depending on time. Frequency multiuser diversity is to allocate a subcarrier to a user having the highest gain value in each frequency domain of a frequency multiplexing carrier system such as Orthogonal Frequency Division Multiplexing (OFDM).

If a channel is very slowly changed in a system that does not use multiple carriers, the user having the highest channel gain value will exclusively occupy the channel for a long time. For this reason, other users cannot perform communication. In this case, for application of multiuser diversity, it is necessary to guide channel change.

Next, according to spatial multiuser diversity, channel gains of users are different from one another depending on space. An example of the spatial multiuser diversity includes random beamforming (RBF). The RBF is also referred to as "opportunistic beamforming." According to the RBF, the transmitter performs beamforming at a random weight value using multiple antennas to guide channel change.

A multiuser MIMO (MU-MIMO) scheme that uses the aforementioned multiuser diversity for a MIMO scheme will be described as follows.

According to the multiuser MIMO scheme, the transmitter and the receiver enable several kinds of combinations in the number of users and the number of antennas of each user. The multiuser MIMO scheme will be described based on a downlink (forward link) and an uplink (reverse link). The downlink means a communication link through which the base station transmits a signal to a user equipment. The uplink means a communication link through which a user equipment transmits a signal to the base station.

In case of the downlink, for extreme examples, one user may receive a signal through a total of $N_R$ antennas, or a total of $N_R$ users may respectively receive a signal through one antenna. Also, intermediate combination of the extreme examples may be provided. Namely, combination can be provided in such a manner that a user uses one receiving antenna whereas another user uses three receiving antennas. It is noted that the number of a total of receiving antennas is equally maintained as $N_R$ in any case. This case will be referred to as MIMO BC (Broadcast Channel) or SDMA (Space Division Multiple Access).

In case of the uplink, for extreme examples, one user may transmit a signal through a total of $N_T$ antennas, or a total of $N_T$ users may respectively transmit a signal through one antenna. Also, intermediate combination of the extreme examples may be provided. Namely, combination can be provided in such a manner that a user uses one transmitting antenna whereas another user uses three transmitting antennas. It is noted that the number of a total of transmitting antennas is equally maintained as $N_T$ in any case. This case will be referred to as MIMO MAC (Multiple Access Channel). Since the uplink and the downlink are in a symmetrical relation to each other, the scheme used in any one side of the uplink and the downlink may be used in the other side.

Meanwhile, the number of rows and columns of the channel matrix H representing the channel status is determined by the number of transmitting and receiving antennas. In the channel matrix H, the number of rows is equal to the number $N_R$ of receiving antennas, and the number of columns is equal to the number $N_T$ of transmitting antennas. Namely, the channel matrix H becomes $N_R \times N_T$.

A rank of the matrix is defined by a minimum number of rows or columns independent from one another. Accordingly, the rank of the matrix cannot be greater than the number of rows or columns. The rank rank(H) of the channel matrix H is limited as follows.

$$\text{rank}(H) \leq \min(N_T, N_R) \quad \text{[Equation 11]}$$

Alternatively, the rank can be defined by the number of eigenvalues not 0 when eigenvalue decomposition is performed for the matrix. Similarly, the rank can be defined by the number of singular values not 0 when singular value decomposition is performed for the matrix. Accordingly, in the channel matrix, the rank can physically be defined as a maximum number that can be transmitted from a given channel as different kinds of information.

Each of different information transmitted using multiple antenna schemes may be defined "transmitting stream" or more simply "stream" unless contrary defined. The term stream may be also referred to as "layer." Then, the number of transmitting stream (or layer) cannot be larger than the rank of channel, which is the maximum number of different kinds of information to be transmitted through the channel.

Transmitter and Receiver of MIMO System

Figure 5:
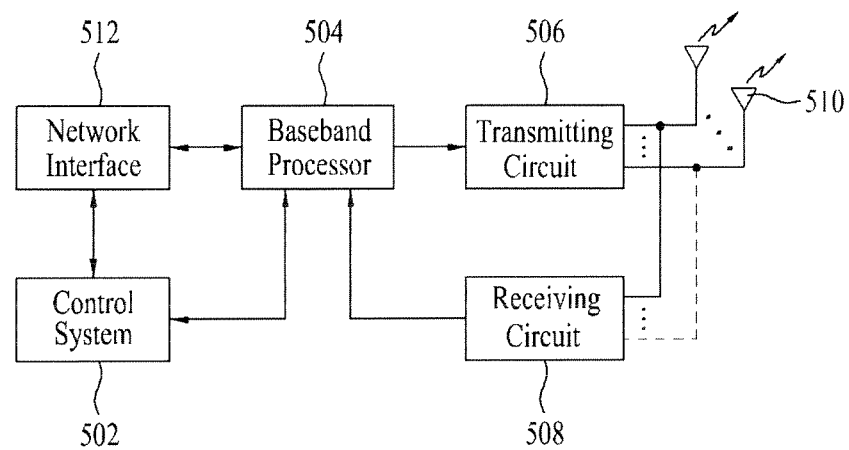
FIG. 5 is a block diagram illustrating a base station that can be applied to one embodiment of the present invention.

FIG. 5 is a block diagram illustrating a base station that can be applied to one embodiment of the present invention.

Referring to FIG. 5, the base station includes a control system 502, a baseband processor 504, a transmission circuit 506, a receiving circuit 508, multiple antennas 510, and a network interface 512. The receiving circuit 508 receives a radio signal from an user equipment through the multiple antennas 510. Preferably, a low noise amplifier and filter (not shown) amplifies a signal and filters broadband interference. A down-conversion and digitalization circuit (not shown) down-converts the filtered receiving signal to an intermediate or baseband frequency signal and digitalizes the down-converted signal to one or more digital streams.

The baseband processor 504 processes the digitalized receiving signal and extracts information or data bits from the receiving signal. In this case, the processing includes demodulation, decoding, and error correction. The baseband processor 504 is generally implemented by one or more digital signal processors (DSP). Afterwards, receiving information is transmitted to a radio network through the network interface, or is transmitted to another user equipment served by the base station. The network interface 512 interacts with a circuit line exchange network that forms a part of a radio network that can be connected with a central network controller and a public switched telephone network (PSTN).

At the transmitter, the baseband processor 504 receives digitalized data that can represent voice, data or control information, from the network interface 512 under the control of the control system 502, and encodes the data for transmission. The encoded data are input to the transmission circuit 506. The encoded data are modulated in the transmission circuit 506 by desired transmission frequencies or carriers having frequencies. A power amplifier (not shown) amplifies the modulated carrier signal at a proper level. The amplified signal is transmitted to the multiple antennas 510.

Figure 6:
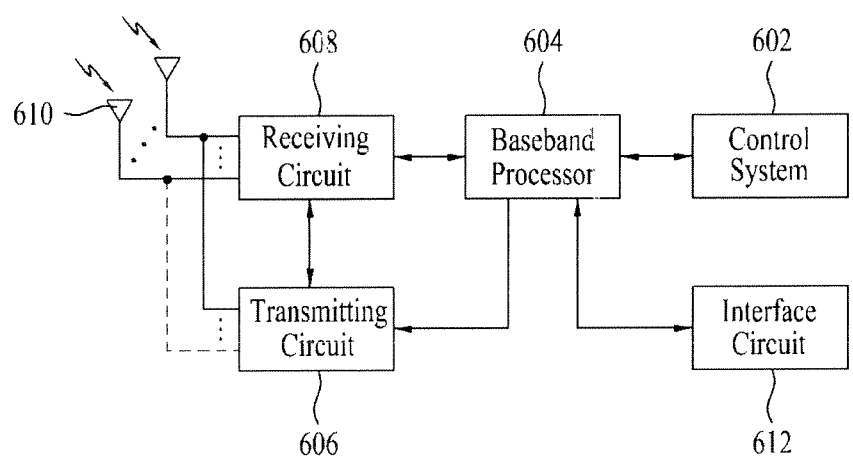
FIG. 6 is a block diagram illustrating a user equipment that can be applied to one embodiment of the present invention.

FIG. 6 is a block diagram illustrating a user equipment that can be applied to one embodiment of the present invention.

Referring to FIG. 6, the user equipment includes a control system 602, a baseband processor 604, a transmission circuit 606, a receiving circuit 608, multiple antennas 610, and a user interface 612. The receiving circuit 608 receives a radio signal including information from one or more base stations through the multiple antennas 610. Preferably, a low noise amplifier and filter (not shown) amplifies a signal and filters broadband interference. Afterwards, a down-conversion and digitalization circuit (not shown) down-converts the filtered receiving signal to an intermediate or baseband frequency signal and then digitalizes the down-converted signal to one or more digital streams. The baseband processor 604 processes the digitalized receiving signal to extract information or data bits from the receiving signal. In this case, the processing includes demodulation, decoding, and error correction. The baseband processor 604 is generally implemented by one or more digital signal processors (DSP) and an application-specific integrated circuit (ASIC).

At the transmitter, the baseband processor 604 receives digitalized data that can represent voice, data or control information, from the user interface 612 under the control of the control system 602, and encodes the data for transmission. The encoded data are input to the transmission circuit 606. The encoded data are modulated in the transmission circuit 606 by desired transmission frequencies or carriers having frequencies. A power amplifier (not shown) amplifies the modulated carrier signal at a proper level. The amplified signal is transmitted to the multiple antennas 610.

Figure 7:
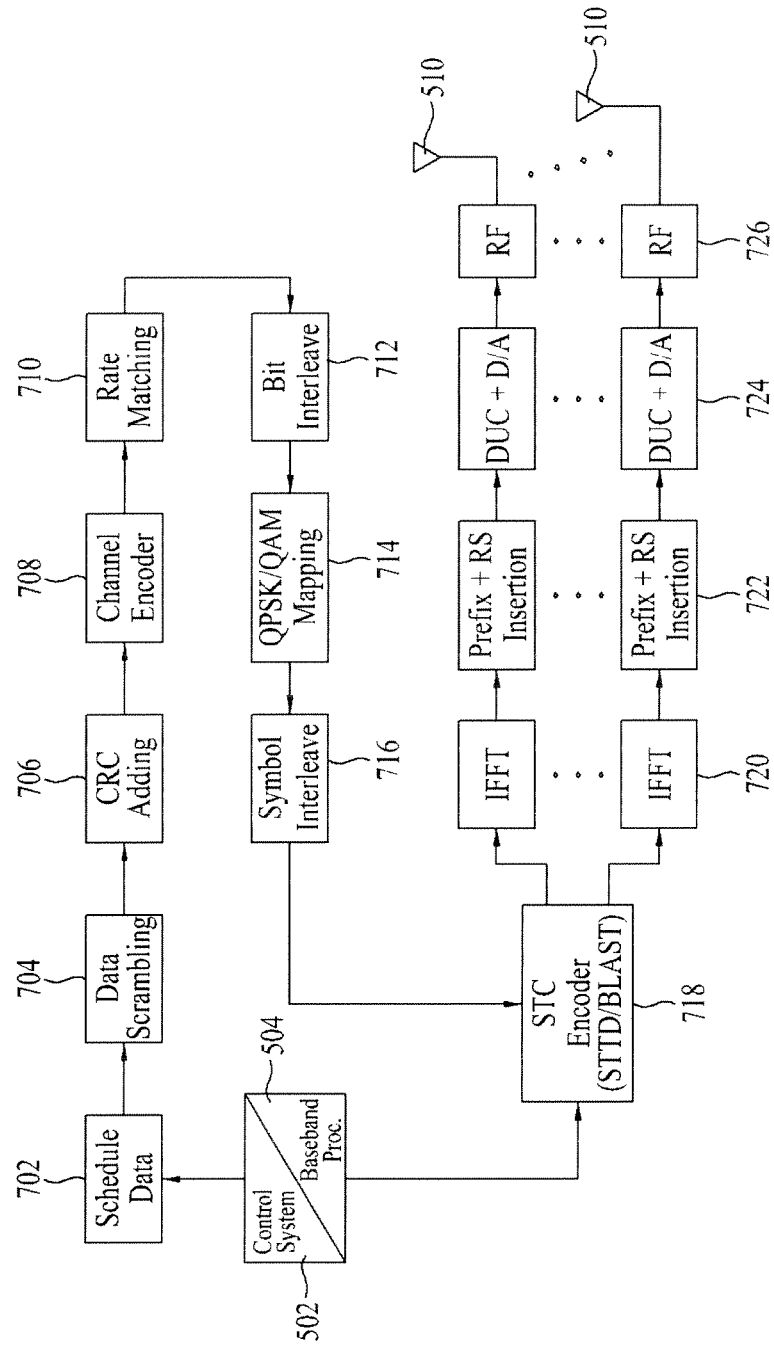
FIG. 7 is a block diagram illustrating a transmitter that can be applied to one embodiment of the present invention.

FIG. 7 is a block diagram illustrating a transmitter that can be applied to one embodiment of the present invention.

Referring to FIG. 7, although the transmitter has been described based on the base station, the person with ordinary skill in the art will know that the shown structure can be used for uplink and downlink transmission. Also, the transmission structure is intended to represent various multiplexing access structures that include, but not limited to, code division multiple access (CDMA), frequency division multiple access (FDMA), time division multiple access (TDMA), and orthogonal division multiple access (OFDM).

Initially, the network transmits data, which are intended to be transmitted to the user equipment, to the base station. Bit streams, i.e., scheduled data are scrambled by a data scramble module 704 to reduce a peak to average power ratio associated with data. Cyclic redundancy check (CRC) for the scrambled data is determined by a CRC adding module 706 and added to the scrambled data. The user equipment performs channel coding using a channel encoder module 708 to facilitate data recovery and error correction. Redundancy can effectively be added to the data by channel coding. The channel encoder module 708 can use a turbo encoding technology.

The processed data bits are mapped into corresponding symbols by a mapping module 714 depending on the selected baseband modulation. In this case, quadrature amplitude modulation (QAM) or quadrature phase shift keying (QPSK) modulation can be used. Bit groups are mapped into symbols representing a location in a phase constellation and amplitude. Afterwards, symbol blocks are processed by a space time code (STC) encoder module 718. The STC encoder module 718 processes symbols in accordance with a selected STC encoding mode and provides N number of outputs corresponding to the number of multiple transmitting antennas 510 of the base station. The symbol streams output from the STC encoder module 718 are inverse-fourier transformed by an IFFT processing module 720. Afterwards, a prefix and RS insertion module 722 inserts cyclic prefix (CP) and RS to the inverse-fourier transformed signal. Afterwards, a digital uplink conversion (DUC) and digital to analog (D/A) conversion module 724 uplink converts the signal processed by the prefix and RS insertion module 722 into an intermediate frequency in a digital region and converts the processed signal into an analog signal. Then, the analog signal is modulated, amplified and transmitted at a desired RF frequency through the RF module 726 and the multiple antennas 510.

Figure 8:
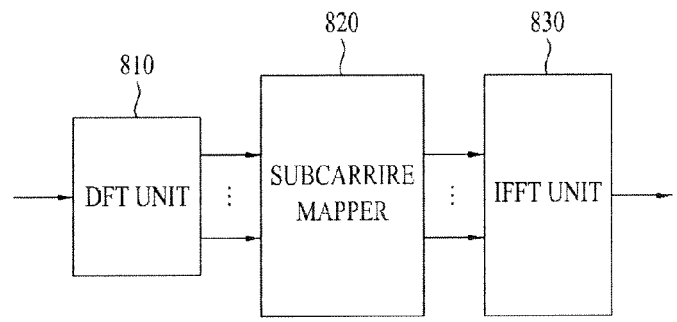
FIG. 8 is a block diagram illustrating a signal generator according to a single carrier—frequency division multiple access (SC-FDMA) scheme, which can be applied to one embodiment of the present invention.

FIG. 8 is a block diagram illustrating a signal generator according to a single carrier—frequency division multiple access (SC-FDMA) scheme, which can be applied to one embodiment of the present invention.

Referring to FIG. 8, the signal generator includes a discrete fourier transform (DFT) module 810 performing DFT, a subcarrier mapper 820, and an inverse fast fourier transform (IFFT) module 830 performing IFFT. The DFT module 810 performs DFT for input data and then outputs frequency domain symbols. The subcarrier mapper 820 maps the frequency domain symbols into each subcarrier, and the IFFT module 830 performs IFFT for the input symbols to output a time domain signal.

Figure 9:
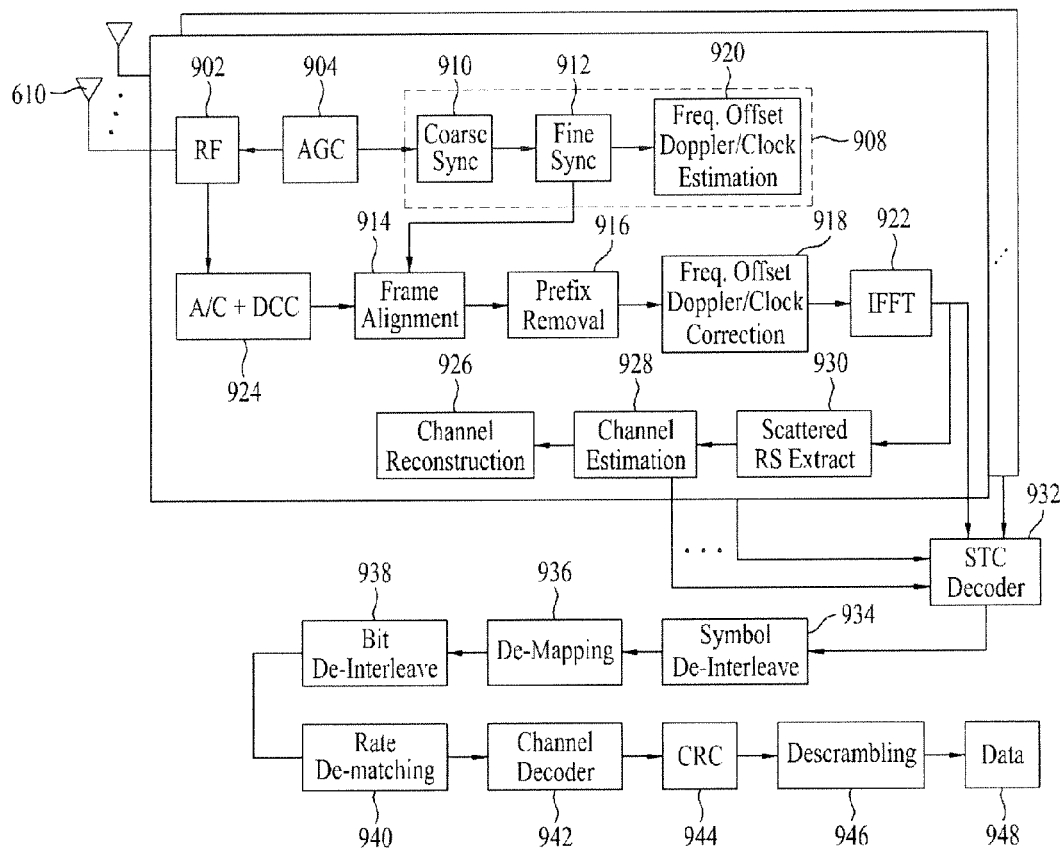
FIG. 9 is a block diagram illustrating a receiver that can be applied to one embodiment of the present invention.

FIG. 9 is a block diagram illustrating a receiver that can be applied to one embodiment of the present invention.

Although the receiver is described based on the user equipment in FIG. 9, the person with ordinary skill in the art will know that the shown structure can be used for uplink and downlink transmission. If transport signals reach the multiple transmitting antennas 610, each signal is demodulated and amplified by an RF module 902. For convenience, one of multiple receiving paths is shown. An analog to digital (A/D) conversion and downlink conversion module (DCC) module 904 digitalizes an analog signal for digital processing and downlink-converts the signal. The digitalized signal can be used for an automatic gain control (AGC) module 906 to control amplifier gain from the RF module 902 based on the received signal level.

The digitalized signal is also provided to a synchronization (Sync) module 908. The synchronization module 908 includes a coarse Sync module 910 performing brief synchronization, a fine Sync module 912 performing fine synchronization, and a module 920 estimating frequency offset and Doppler effect. The result output from the Sync module 908 is provided to a frame alignment module 914 and a frequency offset/Doppler correction module 918. A CP is removed from the aligned frame by a prefix removal module 916. Afterwards, the data from which CP is removed are fourier-transformed by an FFT module 922. An RS extract module 930 extracts RS signal scattered within a frame and provides the extracted RS signal to a channel estimation module 928. Then, a channel reconstruction module 926 reconstructs a radio channel using the result of channel estimation. The channel estimation provides sufficient channel response information so that a STC decoder 932 can decode symbols in accordance with STC encoding used by the base station and recover estimation corresponding to transmission bits. Symbols obtained from the received signal and the result of channel estimation for each receiving path are provided to the STC decoder 932, and the STC decoder 932 performs STC decoding for each receiving path to recover the transmitted symbols. The STC decoder 932 can perform maximum likelihood decoding (MLD) for BLAST based transmission. The output of the STC decoder 932 could be a log likelihood ratio (LLR) for each of transmission bits. The STC decoded symbols are aligned as those of the original order through a symbol de-interleaver module 934. Afterwards, a de-mapping module 936 and a bit de-interleaver module 938 map symbols into bit streams and perform de-interleaving. The bit streams processed by a rate de-matching module 940 are provided to a channel decoder module 942 to recover the scrambled data and CRC checksum. The channel decoder module 942 can use turbo decoding. The CRC module 944 removes CRC checksum in accordance with a conventional manner and checks the scrambled data. Afterwards, the CRC checked data are recovered to original data 948 by a descrambling module 946.

Reference Signal (RS)

When packets are transmitted in a wireless communication system, since the packets are transmitted through a radio channel, signal distortion may occur during packet transmission. In order to receive the distorted signal normally, the receiver should correct distortion of the received signal using channel information. In order to identify channel information, a signal known by both the transmitter and the receiver is transmitted so that the channel information is identified by a distortion level at the time when the signal is received through a channel. In this case, the signal is referred to as a pilot signal or a reference signal. When data are transmitted and received through multiple antennas, a channel status between each transmitting antenna and each receiving antenna should be identified to receive a signal normally. Accordingly, a separate reference signal is required for each transmitting antenna.

Code Division Multiplexing (CDM)—Cyclic Delay in Time Domain

Multiplexing means that reference signals (RS) for different antennas are allocated to one resource region. Examples of the multiplexing include time division multiplexing, frequency division multiplexing and code division multiplexing. Of them, the code division multiplexing means that different orthogonal codes (sequences) separately set for each antenna are multiplied by RS in a frequency domain to allocate the multiplied results to one radio resource (frequency/time). The orthogonal codes could be a type such as $$e^{j2\pi \frac{u}{M} i}.$$

As the orthogonal codes are multiplied in the frequency domain, the RS may be cyclic delayed in a time domain. If the orthogonal codes are multiplied by a sequence $x[i]=\{x_0, x_1, x_2, \ldots, x_{N-1}\}$, cyclic delay in the time domain is expressed as follows.

$$X'[k'] = \sum_{i=0}^{N-1} x[i] \cdot e^{j2\pi\frac{k'}{N}i}, N = MZ, k' = 0, 1, \ldots, N-1 \quad \text{[Equation 16]}$$

$$= \sum_{i=0}^{N-1} x[i] \cdot e^{j2\pi\left(\frac{k'+uZ}{N}\right)i}$$

$$X'[(k-uZ)\bmod N] = \sum_{i=0}^{N-1} x[i] \cdot e^{j2\pi\frac{k}{N}i}$$

$$X'[(k-uZ)\bmod N] = X[k]$$

Accordingly, if $$e^{j2\pi\frac{u}{M}i}$$

is multiplied in the frequency domain, cyclic delay occurs on the time axis.

Structure of Uplink RS in the Conventional 3GPP LTE

Figure 10:
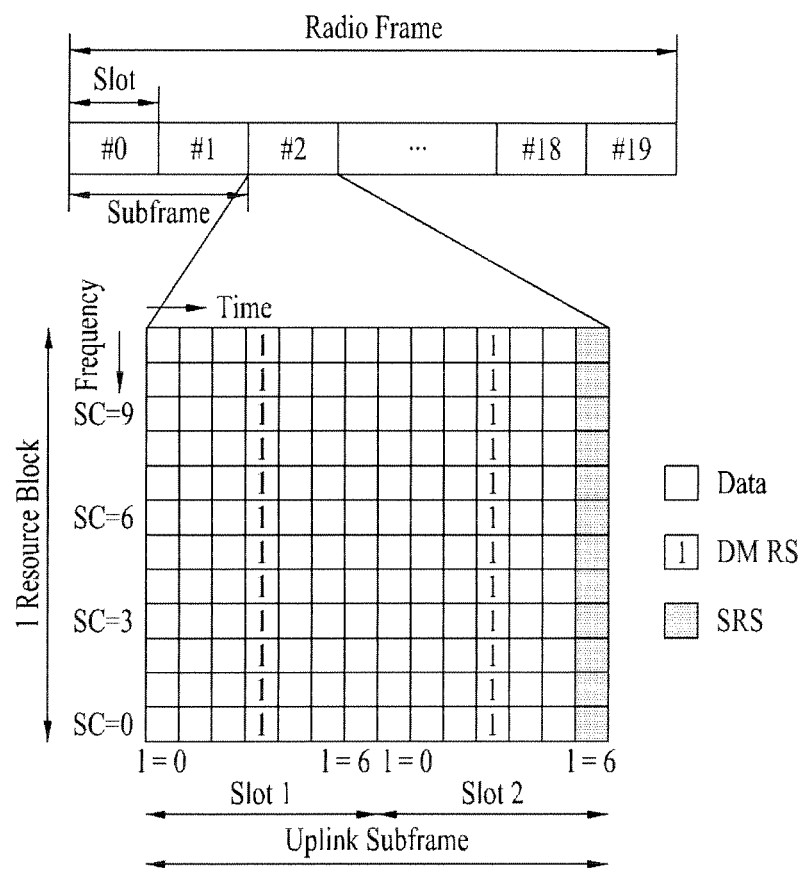
FIG. 10 is a diagram illustrating a structure of a demodulation reference signal (DMRS) of an uplink in 3GPP LTE.
Figure 11A:
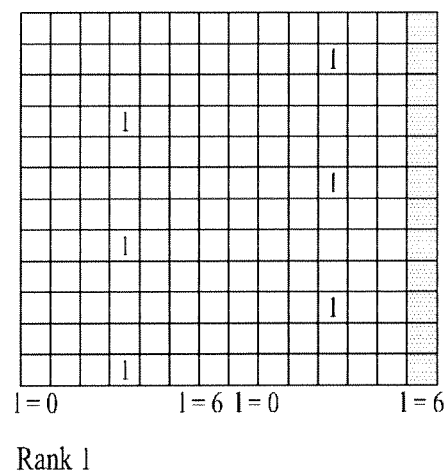
FIG. 11A to FIG. 11D are diagrams illustrating examples of a precoded DMRS allocated to one OFDM symbol per slot in accordance with a frequency division multiplexing (FDM) mode.
Figure 11B:
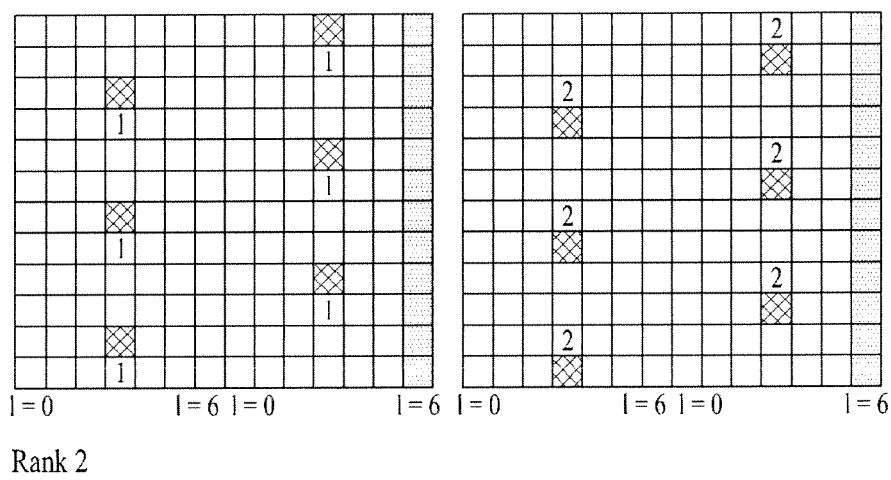
Figure 11C:
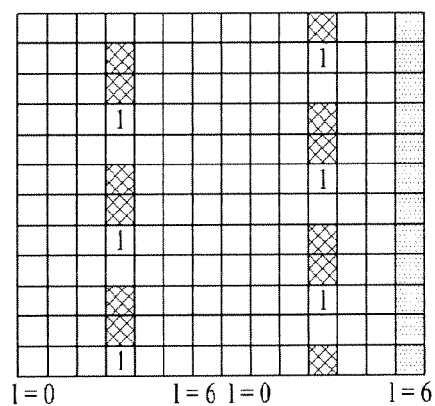
Figure 11C:
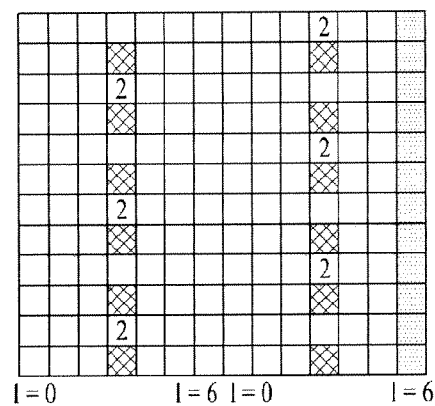
Figure 11C:
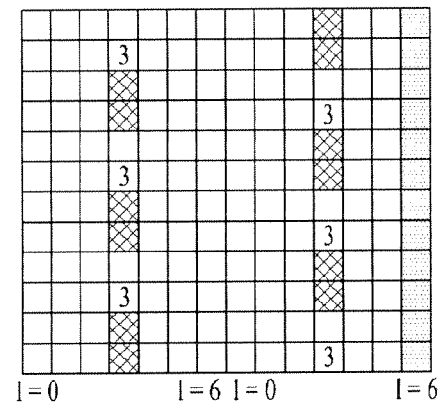
Figure 11D:
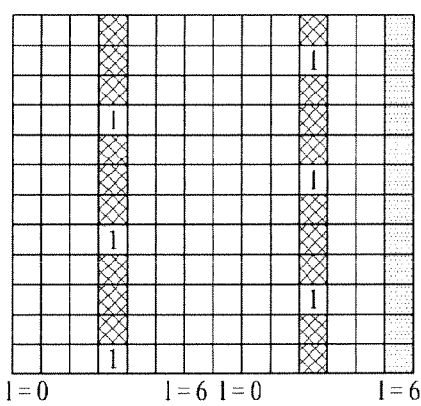
Figure 11D:
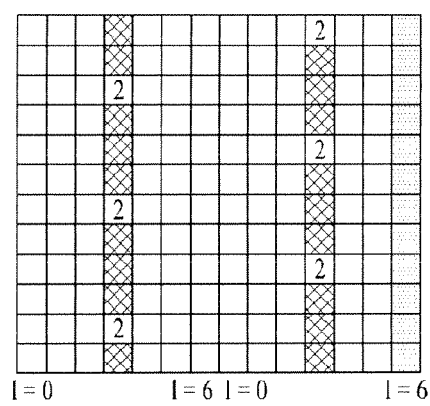
Figure 11D:
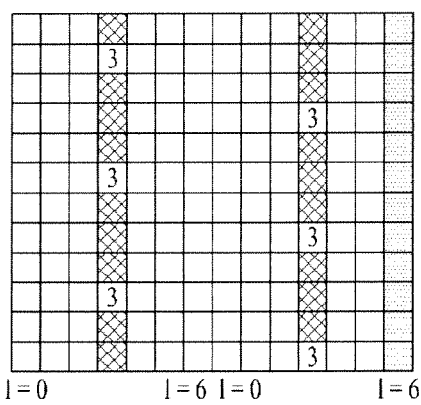
Figure 11D:
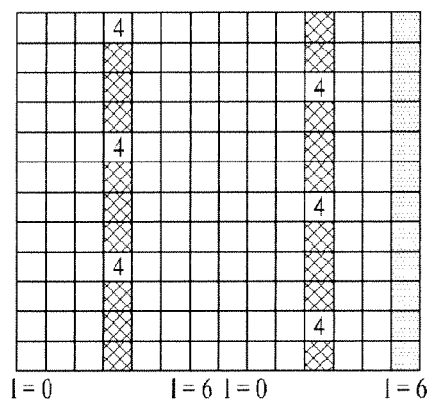
Figure 12A:
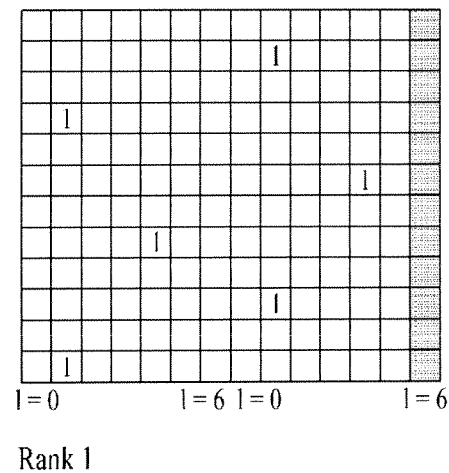
FIG. 12A to FIG. 12D are diagrams illustrating examples of a precoded DMRS allocated to two OFDM symbols per slot in accordance with a frequency division multiplexing (FDM) mode.
Figure 12B:
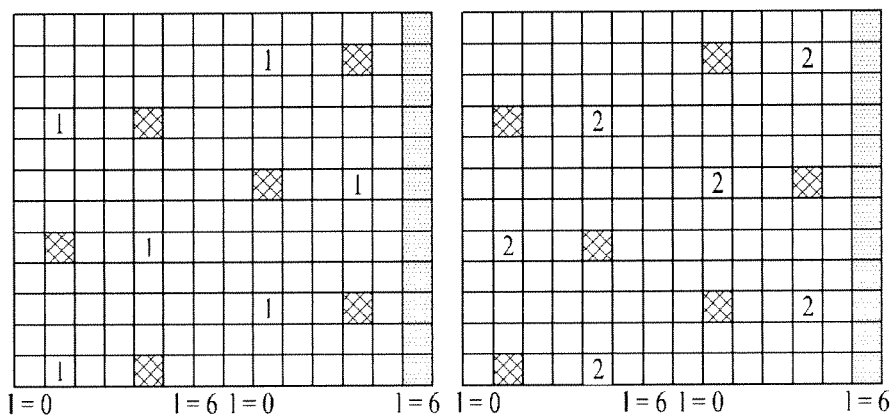
Figure 12C:
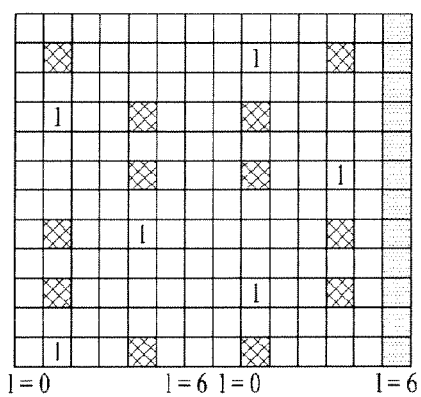
Figure 12C:
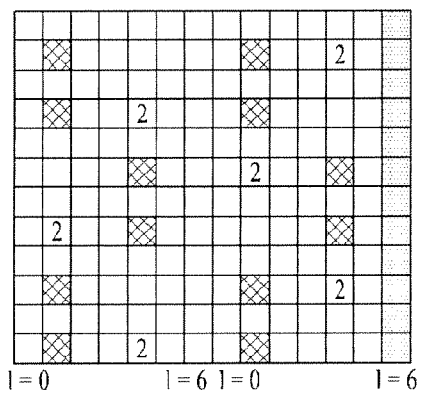
Figure 12C:
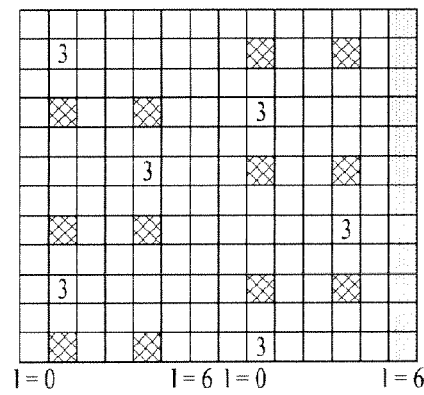
Figure 12D:
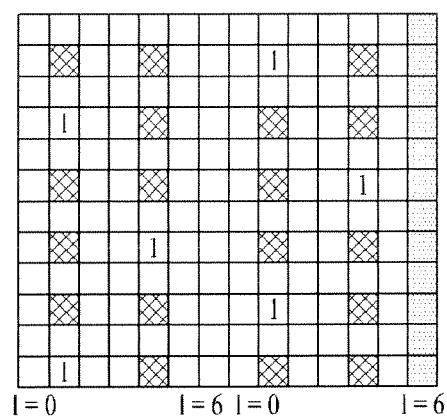
Figure 12D:
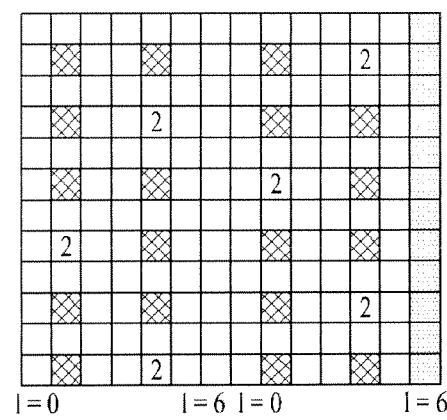
Figure 12D:
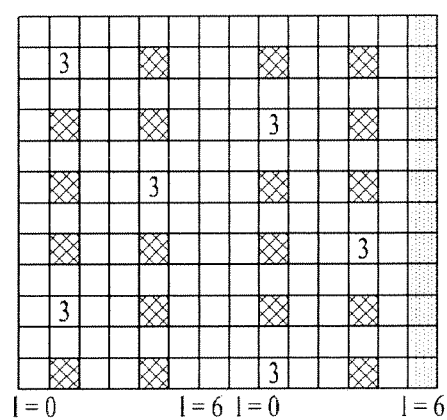
Figure 12D:
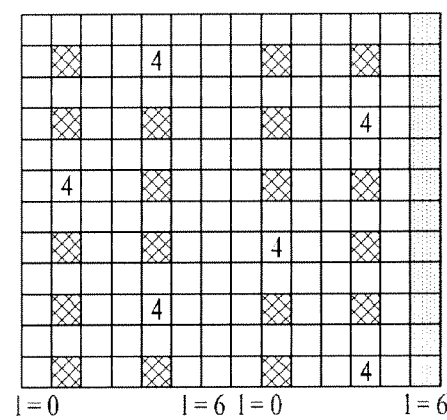

FIG. 10 is a diagram illustrating a structure of uplink reference signals (RS) in the conventional 3GPP LTE.

Referring to FIG. 10, a radio frame includes ten (10) subframes, each of which includes two slots. A transmission time interval (TTI) means the time required to transmit one subframe. In the 3GPP LTE, a subframe is 1 ms, and a slot is 0.5 ms. However, the structure of the radio frame and TTI can be varied depending on a communication system. The structure of the radio frame and subframe can be also used in downlink.

A slot includes a plurality of SC-FDMA symbols in a time domain, and a plurality of resource blocks in a frequency domain. For one resource block, a horizontal axis means a time axis, and a vertical axis means a frequency axis. In case of normal CP, each slot may include seven symbols. In case of extended CP, each slot may include six symbols. The extended CP is generally used under the environment where delay is long. The RS uses all resources of one symbol to satisfy single carrier characteristics in a single carrier-frequency division multiple access (SC-FDMA) system. Meanwhile, unlike data, DFT transformation precoding is not applied to the RS in the uplink, and the RS includes demodulation RS (DMRS) and sounding RS (SRS). In FIG. 10, the DMRS are allocated to l=4 of slots 1 and 2 and expressed as '1.' The SRS are allocated to l=6 of slot 2. The data are allocated to the other resource elements.

Transmission of DMRS Using Multiple Antennas

It is noted that the following embodiment of the present invention is described based on the LTE-A but can equally be applied to all MIMO systems. Moreover, it is also noted that the following embodiment of the present invention is described based on MIMO transmission in uplink for simplicity but the exemplified embodiments can also applied to MIMO transmission in downlink. This can be easily understood and achieved since the uplink and the downlink are in a symmetrical relation to each other, the scheme used in any one side of the uplink and the downlink may be used in the other side.

In the 3GPP LTE system, the user equipment supports a single antenna only. Accordingly, in the LTE system, the number of antennas used for the uplink is one. However, in case of the LTE-A system, the user equipment supports MIMO even in the uplink. Accordingly, the DMRS should be extended properly considering MIMO scheme. In order to extend the DMRS to conform to the MIMO environment, non-precoded DMRS and precoded DMRS can be considered. In the same manner as the downlink according to the related art, the non-precoded DMRS needs DMRS patterns equivalent to the number of antennas. Namely, in case of the non-precoded DMRS, DMRS patterns should be defined depending on the number of antennas that can be supported by the system. However, in case of the precoded-DMRS, a precoding matrix is multiplied by channel information measured by the User and DMRS patterns are applied for each rank corresponding to a virtual antenna domain. Accordingly, it is advantageous in that overhead of DMRS can be reduced even though the number of antennas increases. In other words, in case of the precoded DMRS, DMRS patterns should be defined depending on the rank that can be supported by the different channel conditions. For example, supposing that the number of transmitting antennas, which can be supported by the system, is 1, 2 and 4, three patterns should be defined in the non-precoded DMRS while patterns should be defined for rank 1, 2, 3 and 4 in the precoded DMRS. Hereinafter, the case where the number of transmitting antennas is 4 will be described. However, the following embodiment of the present invention can similarly be applied to all systems having a plurality of transmitting antennas. Although the precoded DMRS and the non-precoded DMRS should be applied to the LTE-A system considering their advantages and disadvantages, since the precoded DMRS covers all available ranks, DMRS pattern for each rank will be defined. However, the non-precoded DMRS may have the same pattern as that of the precoded DMRS in other ranks except for rank 3.

Examples of Allocation Pattern of Reference Signal According to Rank

FIG. 11 illustrates examples of a precoded DMRS allocated to one OFDM symbol per slot in accordance with a frequency division multiplexing (FDM) mode.

FIG. 11A to FIG. 11D illustrate structures of DMRS when rank of a user equipment is 1 to 4. As described above, in case of the non-precoded DMRS, DMRS patterns of rank 1, rank 2 and rank 4 can be used as those of one antenna, two antennas and four antennas. In FIG. 11A to FIG. 11D, each subframe is used for transmitting each corresponding layer. Alternatively, each subframe can be assumed to be transmitted through each corresponding virtual antenna. In FIG. 11A to FIG. 11D, '1', '2', '3' and '4' respectively mean DMRS for layer 1 (or virtual antenna 1), layer 2 (or virtual antenna 2), layer 3 (or virtual antenna 3), and layer 4 (or virtual antenna 4). Parts marked with ■ in each subframe represent resource elements related with other reference signals. Depending on communication conditions, MIMO environments, MIMO scheme and the like, in each subframe, resource elements related with other reference signals may be used to transmit data. Alternatively, in each subframe, resource elements related with other reference signals may be punctured to provide orthogonality between DMRS for layers in SU-MIMO or between DMRS for different users in MU-MIMO in terms of total transmission rank. Namely, other data or DMRS for other rank may be transmitted to the parts marked with ■. In FIG. 11, DMRS is transmitted to one symbol per slot. However, in the MIMO-OFDM system, DMRS can be transmitted to several symbols.

FIG. 12A to FIG. 12D are diagrams illustrating examples of a precoded DMRS allocated to two OFDM symbols per slot in accordance with a frequency division multiplexing (FDM) mode. FIG. 12 is basically the same as FIG. 11 except that the reference signals are allocated using two OFDM symbols per slot. Accordingly, for the description of FIG. 12, refer to the description of FIG. 11.

Embodiment

Dynamic Control of Pattern of Reference Signal

According to the related art, even though a rank value is varied as illustrated in FIG. 11 and FIG. 12, basic pattern for allocating a reference signal of each rank has not been changed. However, as a communication environment is changed, it is required to flexibly control a pattern of reference signals. For example, a pattern of required reference signals may be varied depending on quality of service (QoS), channel delay, MIMO mode (SU-MIMO, MU-MIMO), etc. Accordingly, a method of flexibly controlling a pattern of reference signals depending on a communication environment is required. In this respect, the present invention suggests a signaling method for flexibly controlling a pattern of reference signals. Only, flexible pattern of reference signal may cause inefficient use of data resources or deteriorate orthogonality between reference signals. Thus the present invention further suggests a signaling method for efficiently use resources related with the flexible pattern of reference signals. Hereinafter, a MIMO environment based on OFDM will be described unless additionally specified. Also, as can be seen from FIG. 10, in the conventional 3GPP LTE system, overhead of DMRS for uplink transmission is 14.3%. Accordingly, the present invention suggests a method of transmitting DMRS of which overhead does not exceed 14.3% even though a single antenna system is extended to a MIMO system.

Figure 13A:
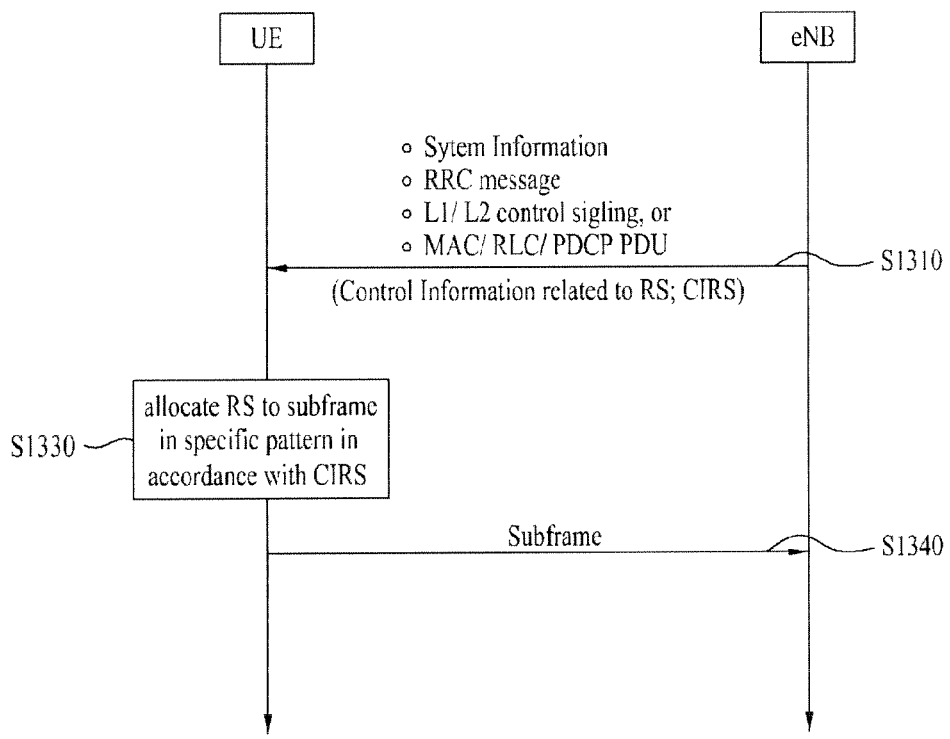
FIG. 13A and FIG. 13B are flow charts illustrating a method of uplink-transmitting reference signals when control information related to reference signal is received in accordance with one embodiment of the present invention.

FIG. 13A is a flow chart illustrating a method of uplink-transmitting reference signals when control information related to reference signal is received in accordance with one embodiment of the present invention. It is noted that the present embodiment can be applied to downlink-transmitting reference signals since the uplink and the downlink are in a symmetrical relation to each other, the scheme used in any one side of the uplink and the downlink may be used in the other side. In that case, signaling for the control information related to reference signal can be performed in a same or similar manner.

Referring to FIG. 13A, the user equipment receives control information related to reference signal (CIRS) from the base station (S1310). The control information includes all kinds of information related to allocation of reference signals. For example, the control information includes information for controlling a pattern of reference signals, information related to multiplexing, information related to whether resources associated with reference signals of other ranks, layers or users are used to transmit data or punctured to provide orthogonality, etc. Afterwards, the user equipment generates a precoded reference signal considering a rank value for uplink transmission. The reference signals could be DMRS. The user equipment allocates the precoded reference signal to a subframe to have a specific pattern depending on the control information (S1330). Then, the user equipment transmits the subframe to which reference signals are allocated with a specific pattern, to the base station (S1340). In this case, the specific pattern is used as a broad concept that includes a method (for example, multiplexing method) used to allocate reference signals, as well as combination of specific locations where the reference signals are arranged within a resource block or a subframe, unless otherwise specified.

Next, a method of signaling the control information related to reference signal in a user equipment will be described. Details of the control information and allocation of reference signals depending on the control information will be described later with reference to the drawings.

The control information related to reference signal can be transmitted to the user equipment through system information (SI), RRC message, L1/L2 control signaling (for example, PDCCH) or MAC/RLC/PDCP PDU. The RRC signal could be a signal related to RRC connection release, RRC connection request, RRC connection setup, radio bearer setup, radio bearer re-setup, and RRC connection re-establishment.

L1/L2 control signaling is located in the first n OFDM symbols where n may be equal to or less than 4. L1/L2 control signaling may be transmitted through physical downlink control channel (PDCCH). PDCCH carries various downlink control information using various downlink control information (DCI) format. Multiple PDCCHs are supported and a user equipment may monitor a set of control channels. PDCCHs are formed by aggregation of control channel elements (CCEs). Each CCE includes 9 resource element groups (REGs) and each REG consists of 4 resource element.

The control information related to reference signal may be explicitly signaled or implicitly signaled with regard to L1/L2 control signaling. As an example of explicit signalling, PDCCH may carry information indicating the control information related to reference signal. PDCCH may carry the control information related to reference signal in various format such as bitmap, index and the like. Just for example, if bitmap is used, each bit may represent pattern of reference signals with regard to rank (e.g. pattern of reference signal for corresponding layer), and extra one or more bits may represent whether resource associated with reference signals of other ranks, layers or users will be used for transmitting data or will be punctured for providing orthogonality between layers in SU-MIMO or between users in MU-MIMO. Indexing may be also designed in a similar manner.

As an example of implicit signalling, the control information related to reference signal may be identified by using specific structure or formation of PDCCH. A user equipment may identify the control information related to reference signal from a certain CCE index related with corresponding PDCCH, the number of scheduled resources, identity/difference of scheduled resources, and the like.

The control information could be user equipment-common (UE-common) information or user equipment-specific (UE-specific) information. If the control information is UE-common information, the control information is common for a unit of PLMN, registered area, tracking area (TA), cell, group or RAT. For example, the control information can be transmitted to all user equipments within a cell through system information. Also, the control information is transmitted through release of RRC connection, so that only a specific user equipment performs the operation according to the embodiment of the present invention. In other words, a method of transmitting the control information to the user equipment and an application range with regard to the user equipment can be varied depending on whether the control information is UE-common information or UE-specific information.

The control information can be indicated by the base station periodically/non-periodically. Also, the control information can be invalided in some cases. For example, when the control information is UE-common information, the control information can be invalidated if PLMN, tracking area (TA), cell, group or RAT is changed. For another example, when the control information is UE-specific information, the control information can be invalidated as the user equipment is shifted from an idle mode to a connection mode. Namely, the control information can be invalidated by a specific RRC signal for shifting the user equipment from the idle mode to the connection mode. For example, the control information can be invalidated at the time when the user equipment sends RRC connection request, receives RRC connection setup from the base station, or sends RRC connection complete to the base station. For example, the control information can be invalidated by RRC connection. Also, the user equipment can invalidate the control information when a predetermined time passes after receiving the control information. On the other hand, the control information can be invalided as the user equipment is shifted from the connection mode to the idle mode. Namely, the control information can be invalidated by a specific RRC signal for shifting the user equipment from the connection mode to the idle mode.

Figure 13B:
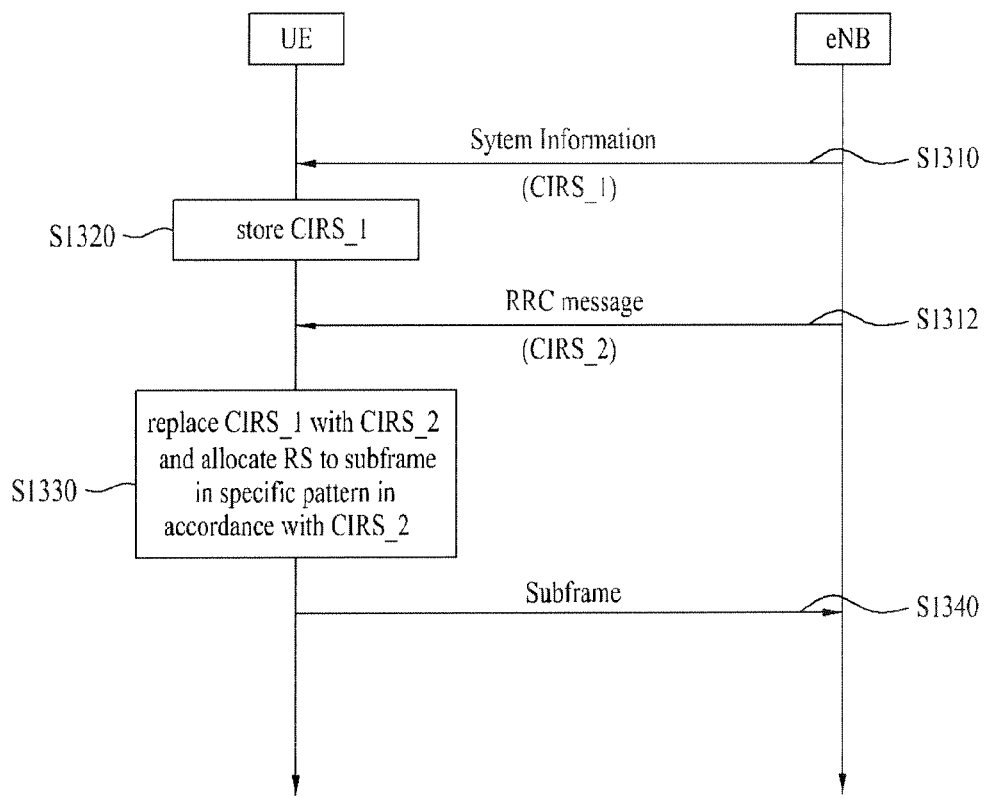

FIG. 13B is a flow chart illustrating a method of uplink-transmitting reference signals when control information related to reference signal is repeatedly received in accordance with one embodiment of the present invention. It is noted that the present embodiment can be applied to downlink-transmitting reference signals since the uplink and the downlink are in a symmetrical relation to each other, the scheme used in any one side of the uplink and the downlink may be used in the other side. In that case, signaling for the control information related to reference signal can be performed in a same or similar manner.

The user equipment can repeatedly receive control information from the base station. In this case, the same control information or different kinds of control information may be transmitted to the user equipment. If the user equipment repeatedly receives the control information, the user equipment can apply the UE-specific control information prior to the UE-common control information. Also, the user equipment can apply control information received by a specific method, prior to control information received by other methods. For example, after receiving control information through system information (S1310), the user equipment may receive control information once more through RRC message (for example, RRC connection) (S1312). In this case, the user equipment disregards control information CIRS_1 received from the system information and uplink-transmits a signal in accordance with control information CIRS_2 received through the RRC message (S1330, S1340).

Hereinafter, the control information related to reference signal will be described in detail.

In structure of an uplink DMRS according to the 3GPP LTE system, DMRS is transmitted through one symbol as illustrated in FIG. 10. However, the LTE-A system may not be required to transmit DMRS using all resource elements in one symbol, e.g. 12 consecutive resource elementsdepending on employed multiple access scheme. This is preferable in view of overhead.

Accordingly, the control information can include information related to overhead or density of the reference signals. Overhead of the reference signals means a ratio occupied by a resource element to which reference signals are allocated, among all resource elements included in a resource block. Density of the reference signals can mean a ratio occupied by a resource element to which reference signals are allocated, among a total of resource elements included in a resource block. The density can represent density of the reference signals within a specific region. The specific region could be a unit of subframe, slot and OFDM symbol. Accordingly, density of the reference signals may be different even in case of the same overhead. The overhead and the density can be determined considering all reference signals. Preferably, the density or the overhead can be defined based on a reference signal of each rank.

Furthermore, the control information can include information related to a frequency interval of the reference signal of each rank. In this case, the frequency interval means a subcarrier interval, e.g. the number of subcarrier, between adjacent (or neighboring) reference signals on a frequency axis. At this time, the adjacent reference signals may not be within a single OFDM symbol, and may be distributed into several OFDM symbols, slots, or subframes. The frequency difference between subcarriers can be varied depending on a profile of the OFDM system. For example, the frequency spacing between subcarriers could be 15 kHz. For convenience, information related to the frequency interval will be referred to as 'M factor.' The 'M factor' may mean an interval between DMRS of the same rank. The M factor can be defined by the base station considering a rank value of the user equipment. If the user equipment indicates the M factor, an allocation pattern of the reference signal in the user equipment can be determined. If an empty space (resource element) occurs between the DMRS due to the M factor, the user equipment can transmit data using the empty space or vacate the space for DMRS of other rank, layer or users. Information as to how the space can be used can be included in the control information, can be signaled separately, or can be predetermined.

Figure 14:
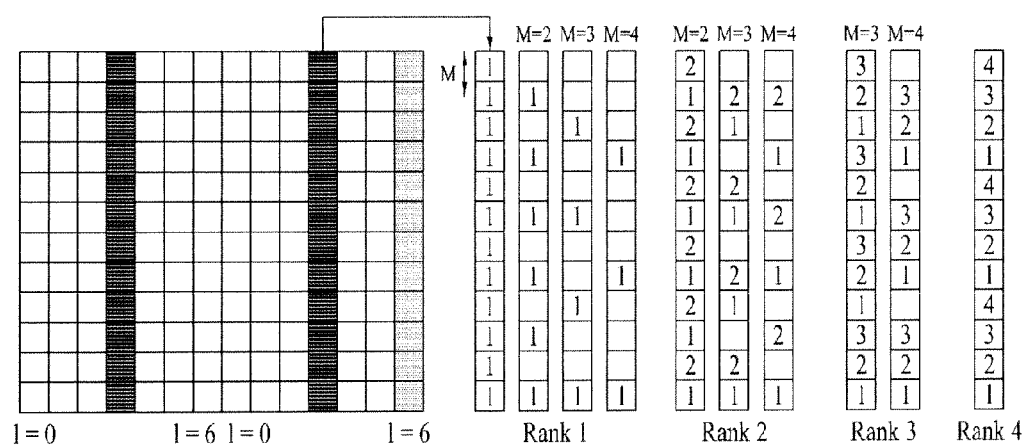
FIG. 14 is a diagram illustrating an example of reference signals allocated by a frequency division multiplexing (FDM) mode considering M factor in accordance with one embodiment of the present invention.

FIG. 14 is a diagram illustrating an example of reference signals allocated to one OFDM symbol per slot by a frequency division multiplexing (FDM) mode considering M factor in accordance with one embodiment of the present invention.

Referring to FIG. 14, when a rank value is 1, M could be 1, 2, 3 or 4. Also, when a rank value is 2, M could be 2, 3 or 4. Also, when a rank value is 3, M could be 3 or 4. Also, when a rank value is 4, the number of DMRS becomes insufficient if a resource for data is empty. Accordingly, when a rank value is 4, one symbol is used by the DMRS only. Since a location of symbols illustrated in FIG. 14 is exemplary, the reference signals can be allocated to other symbols. Also, although the reference signals are allocated to one OFDM symbol per slot in FIG. 14, the reference signals may be allocated to two or more OFDM symbols. Also, since the location of the DMRS arranged by the M factor is exemplary, the DMRS may be arranged in another manner if the frequency interval of the DMRS is assured. Unlike the example of FIG. 14, the frequency interval according to the M factor can be defined as frequency interval between neighboring reference signals within one subframe or slot. In this case, the DMRS can be staggered within the subframe or slot.

FIG. 15 is a diagram illustrating an example of reference signals allocated with regard to each rank considering M factor in accordance with one embodiment of the present invention. In FIG. 15, reference signals are allocated to one OFDM symbol per slot. FIG. 15A to FIG. 15D illustrate examples of allocating reference signals when a rank value is 1 to 4. In this case, a frequency interval of the reference signals is defined as frequency interval between neighboring reference signals within one OFDM symbol.

Figure 15A:
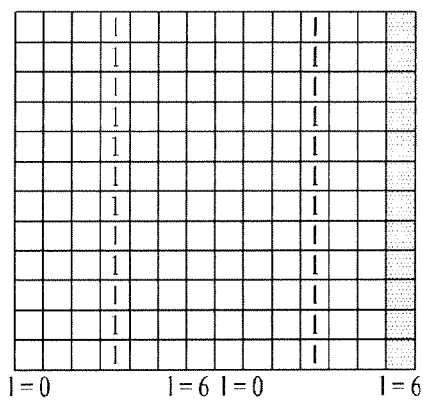
Figure 15A:
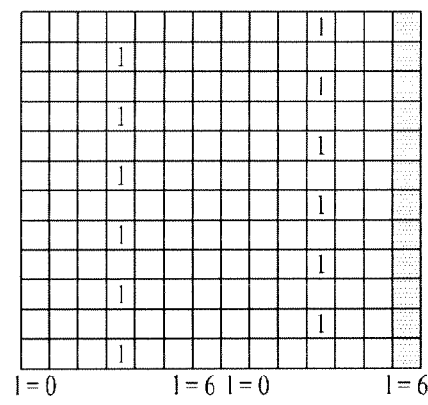
Figure 15A:
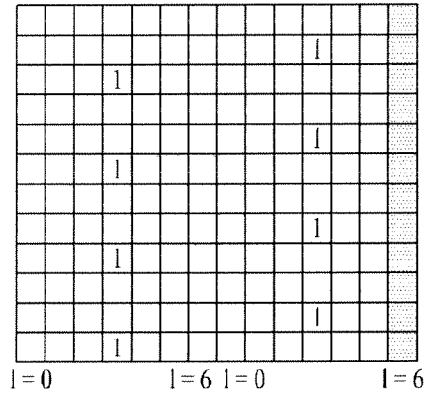
Figure 15A:
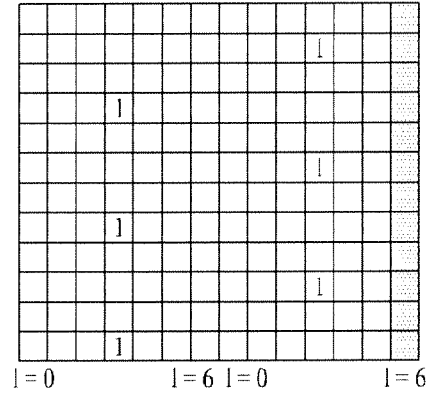

Referring to FIG. 15A, since a rank value is 1, the M factor could be 1, 2, 3 or 4. It is noted that density, overhead or frequency interval of the reference signals is varied depending on a value of the M factor. When the M factor is 2, 3, or 4, an empty resource element occurs between the reference signals. As described above, the empty resource element can be used for data transmission, or can be punctured. When the M factor is 2, 3, or 4, the reference signals are located in different subcarriers of slot 1 and slot 2 of the subframe, and are cyclic-shifted in a frequency domain to obtain frequency diversity. In addition, the reference signals can be cyclic-shifted in a time domain. Information required to cyclic-shift the reference signals in the frequency or time domain can be included in the control information related to reference signal, or can be signaled separately. The information required to cyclic-shift the reference signals could be frequency offset or time offset. When M is 4, the reference signals of slot 1 and slot 2 respectively have frequency offset of 0 and 2 based on subcarrier of 0 (SC=0).

Figure 15B:
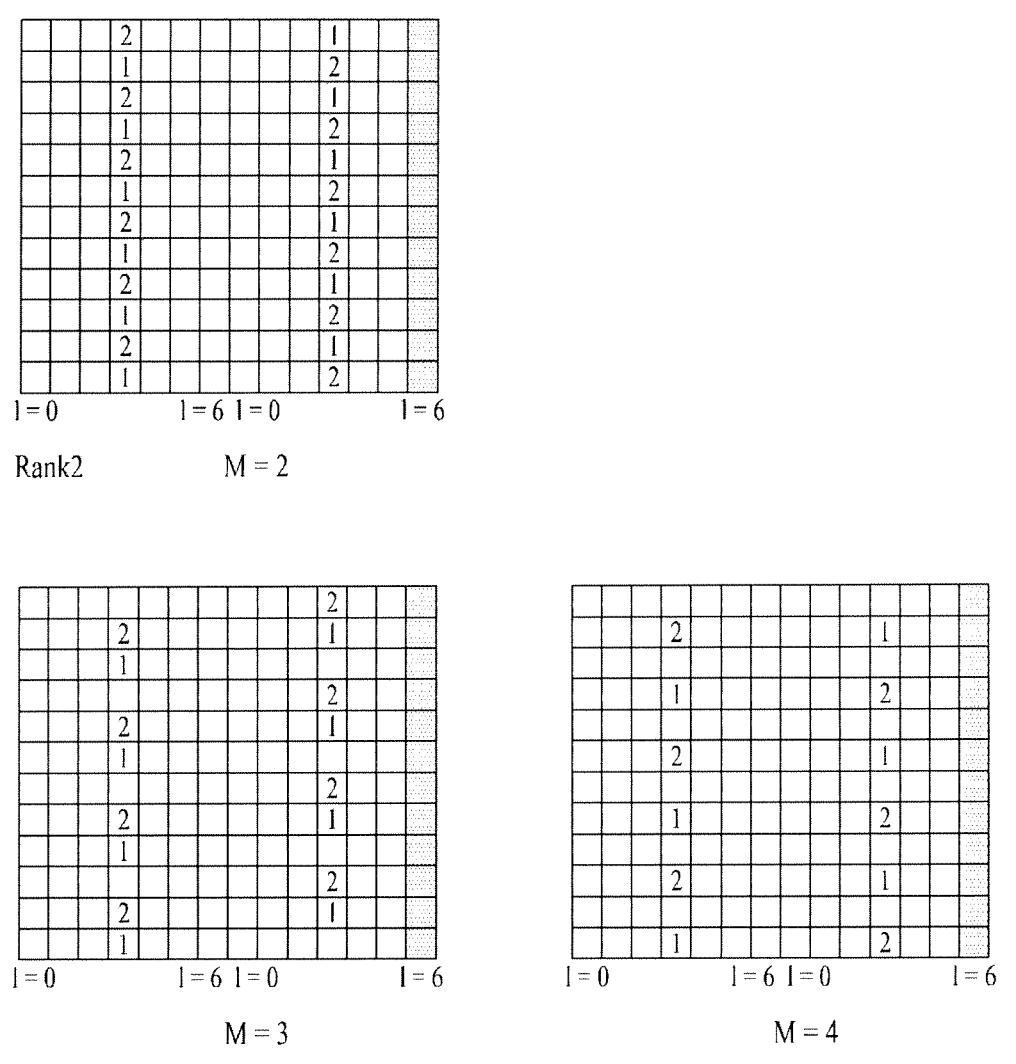
Figures 15C, 15D:
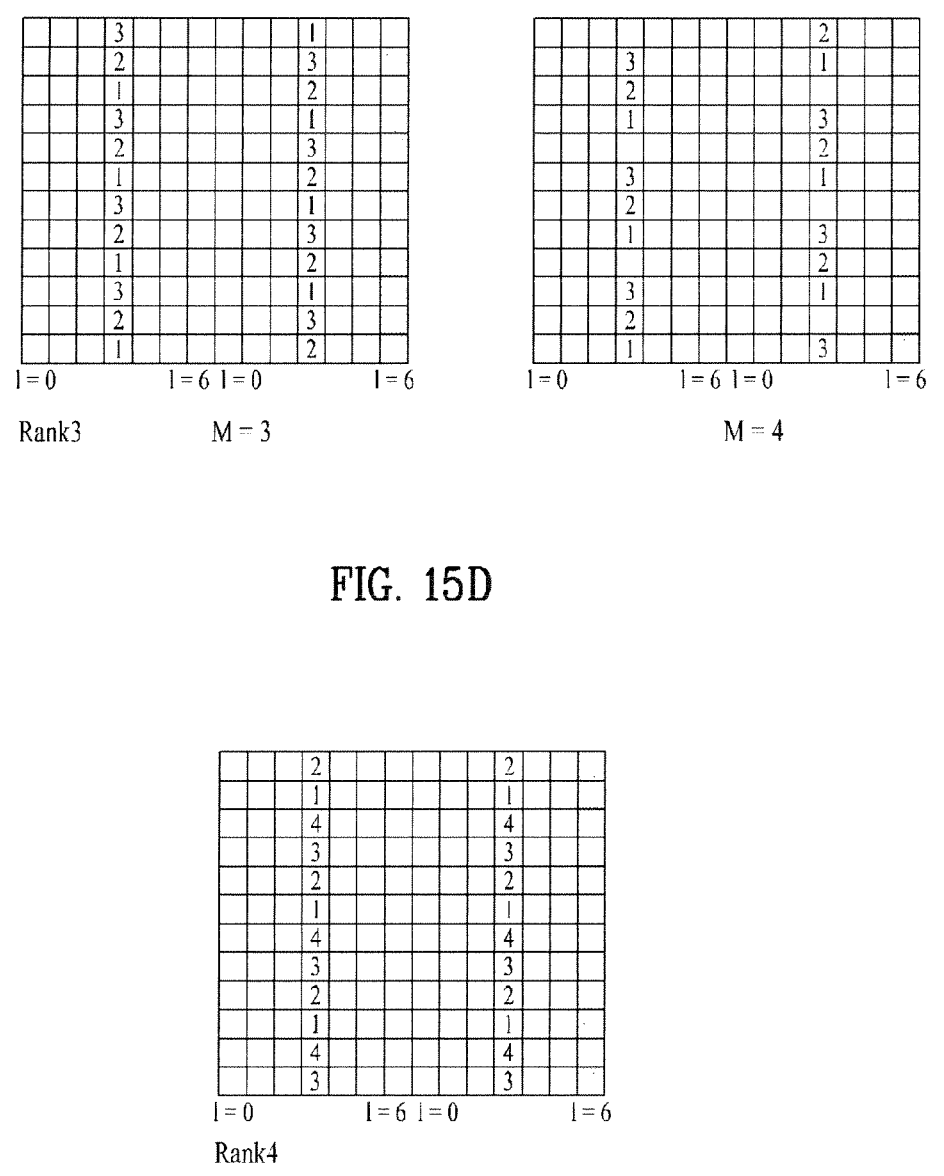

FIG. 15B to FIG. 15D are basically similar to FIG. 15A except that a rank value is different. Accordingly, for description of FIG. 15B to FIG. 15D, refer to the description of FIG. 15A.

Figure 16A:
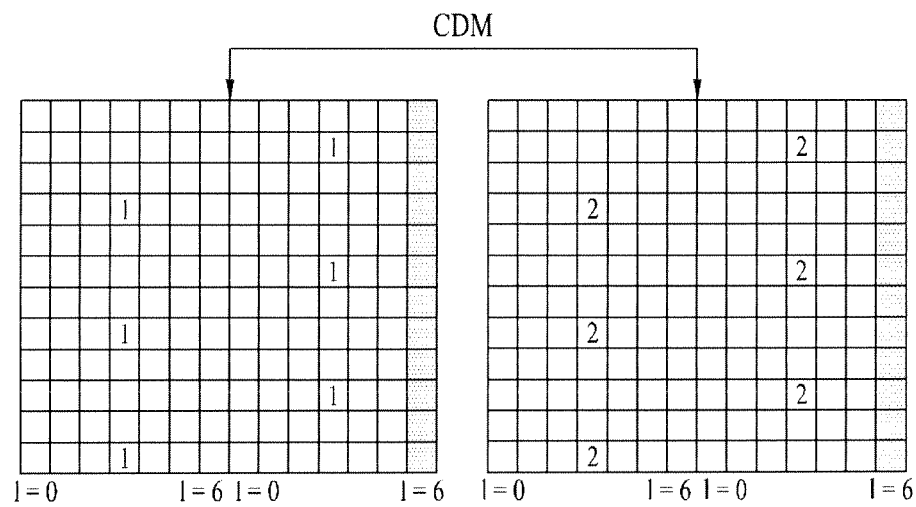
FIG. 16A and FIG. 16B are diagrams illustrating another examples of reference signals allocated with regard to each rank value by a code division multiplexing (CDM) mode considering M factor in accordance with one embodiment of the present invention.
Figure 16A:
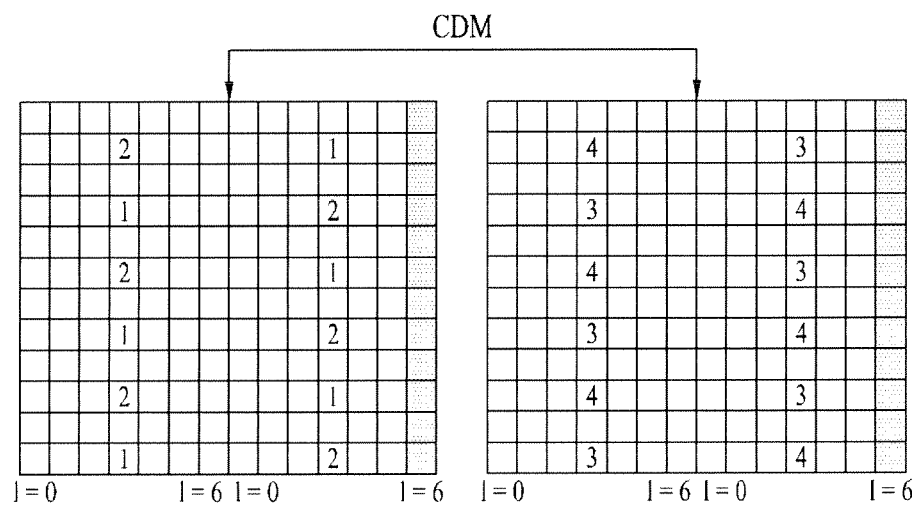
Figure 16B:
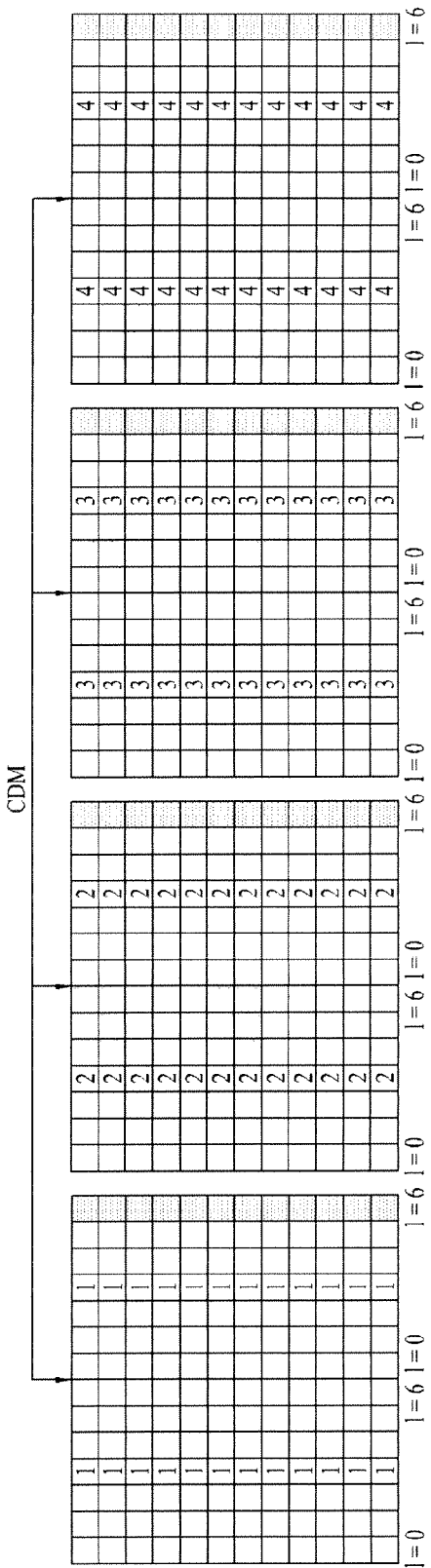

FIG. 16A and FIG. 16B are diagrams illustrating another examples of reference signals allocated with regard to each rank by a code division multiplexing (CDM) mode considering a factor M in accordance with one embodiment of the present invention.

Referring to FIG. 16A, a rank value is 2 and 4. When a rank value is 2, reference signals of layer 1 and layer 2 should be transmitted. Likewise, when a rank value is 4, reference signals of layers 1 to 4 should be transmitted. In each case, virtual antennas corresponding to each rank are paired and then multiplexed by a code division multiplexing mode. In this case, the code $$e^{j2\pi \frac{u}{M} i}$$

can be used, and the reference signals multiplied by the code are delayed in the time domain.

In FIG. 16B, when a rank value is 4, reference signals are allocated by a code division multiplexing mode. Since a rank value is 4 and M factor is 1, reference signals of the respective ranks use all resources of one symbol. In this case, since there is no available resource between the reference signals, the reference signals cannot be identified by the frequency division multiplexing mode. Accordingly, the reference signal of each rank can be identified by the code only. In this case, the reference signals can be transmitted using SC-FDMA, OFDMA, etc.

Also, the control information can include information indicating a rank value for transmission. For example, when a physical antenna of an user equipment is 4, a rank value could be 1, 2, 3, or 4. In this case, for a specific object, the base station needs to limit a rank value. For example, if multi-user MIMO (MU-MIMO) is supported, the base station can limit a rank value applied to each user equipment so that user equipments grouped in one group use a single radio resource without collision.

In this respect, since the uplink of the current 3GPP LTE system is based on SC-FDMA of one antenna, the LTE-A system based on MIMO may need transmission considering backward compatibility. Generally, it is known that MIMO is suitable for the OFDMA system. Accordingly, if the base station limits a rank value for uplink transmission, SC-FDMA or OFDMA can be selectively used depending on the limited rank value. Namely, in case of a user equipment that supports both SC-FDMA and OFDMA, if the limited rank value is less than a predetermined value, the user equipment may use SC-FDMA scheme. If the limited rank value is more than the predetermined value, the user equipment may use OFDMA scheme. For example, for compatibility, even though the user equipment supports the OFDMA system when the rank value is greater than 1 (rank>1), the user equipment can support SC-FDMA when the rank value is basically equal to (rank=1). In this respect, it is considered that the user equipment supports SC-FDMA in case of rank=1 whereas the user equipment supports OFDMA in case of rank>1. It is also considered that the user equipment supports SC-FDMA in case of rank=1 or 2 whereas the user equipment supports OFDMA in case of rank>2.

Furthermore, the control information can include information indicating whether the radio resource for the subframe has been allocated to a single user or multiple users. Alternatively, the control information can include information indicating whether a MIMO mode is single-user MIMO (SU-MIMO) or multi-user MIMO (MU-MIMO). If the control information indicates that the subframe has been allocated to a single user, the reference signal for each rank is only allocated and other resources can be used for data transmission. Namely, in order to ensure orthogonality to the reference signal of other user, it is not necessary to limit use of a specific resource or puncture the specific resource. On the other hand, the control information can indicate that the radio resource for the subframe has been allocated to multiple users. In this case, the reference signals of the respective ranks can be multiplexed within the subframe considering the reference signals of other user equipment allocated to which the same radio resource is allocated. The reference signals of the respective ranks can be multiplexed by a frequency division multiplexing mode, a code division multiplexing mode, or their combination. In order to multiplex the reference signals of the respective ranks with reference signals of other user equipments grouped in the same group, the control information can further include information required to multiplex the reference signals of the respective ranks with the reference signals of other user equipments. For example, the control information can further include information for not overlapping transmission locations or codes/sequences of the reference signals between the user equipments. For example, each user equipment may further need at least one of information related to a rank value of a user equipment which takes part in MU-MIMO, M factor, multiplexing mode, frequency offset, and code/sequence. In more detail, if the frequency division multiplexing mode is used, each user equipment may need information related to a rank value, M factor and frequency offset. If the code division multiplexing mode is used, each user equipment may need M factor and code/sequence.

Figure 17:
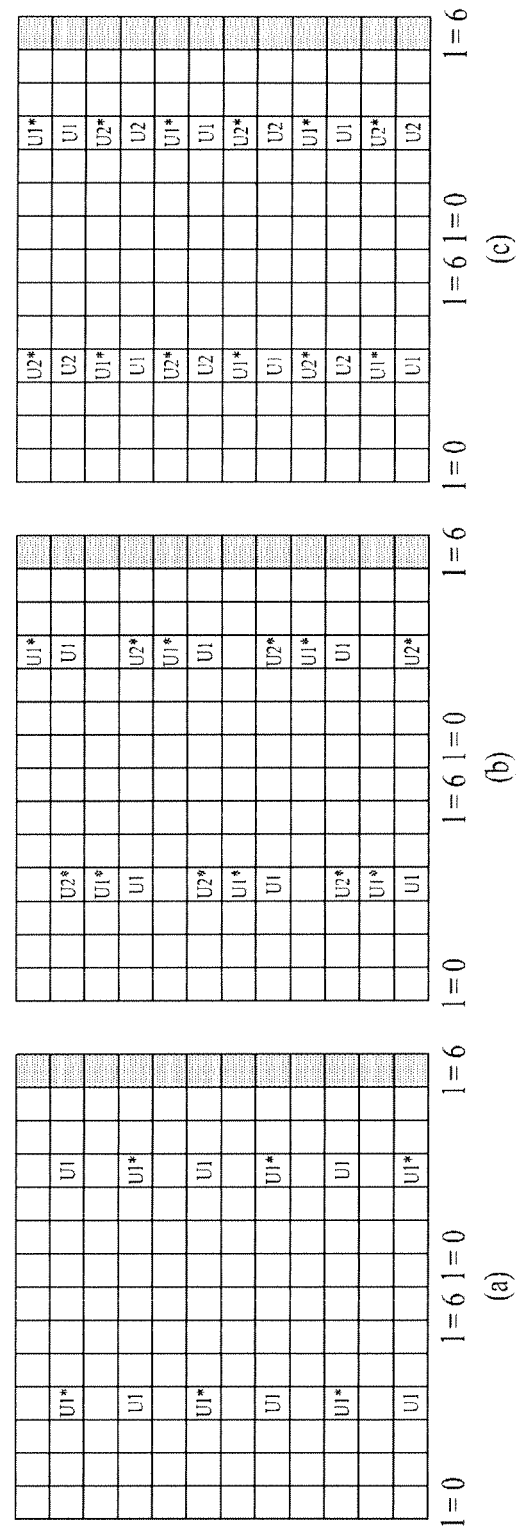
FIG. 17 is a diagram illustrating an example of reference signals allocated by a frequency division multiplexing (FDM) mode to implement Multi User (MU) MIMO in accordance with one embodiment of the present invention.

FIG. 17 is a diagram illustrating an example of reference signals allocated by a frequency division multiplexing (FDM) mode to implement MU MIMO in accordance with one embodiment of the present invention. In FIG. 17, U1 represents a reference signal of layer 1 of a first user equipment, and U2 represents a reference signal of layer 2 of the first user equipment. U1* represents a reference signal of layer 1 of a second user equipment, and U2* represents a reference signal of layer 2 of the second user equipment. Although the frequency division multiplexing mode is illustrated in FIG. 17, the reference signal pattern/mode for supporting MU-MIMO may be defined even by the code division multiplexing mode as illustrated in FIG. 16.

Referring to (a) of FIG. 17, both the first user equipment and the second user equipment have a rank value of 1. The reference signals of the first and second user equipments have a frequency interval of 4. Accordingly, the M factors of the first and second user equipments are commonly 4. However, the reference signals of the first and second user equipments are different from each other in their frequency offset. Based on subcarrier 0 (SC=0) in slot 1, the reference signals of the first and second user equipments have frequency offsets of 0 and 3, respectively (based on reference signal of layer 1). Accordingly, if information related to a rank value, M factor and/or frequency offset is included in the control information related to reference allocation, multi-user MIMO can be implemented effectively. Moreover, each user may need further information on how to manage resources related with reference signals of other user, e.g. resources related with U1* and U2* in view of the first user equipment. In other words, each user may need further information on how to manage resources related with reference signals of unallocated rank in terms of total transmission rank. For example, the first user equipment may need further information on whether the resources related with U1* and U2* may be used to transmit its data or not. This further information may be transmitted using the control information related to reference allocation or separately.

Referring to (b) of FIG. 17, the first user equipment and the second user equipment have rank values of 1 and 2, respectively. The reference signals of the first and second user equipments have a frequency interval of 4. Accordingly, the M factors of the first and second user equipments are commonly 4. However, the reference signals of the first and second user equipments are different from each other in their frequency offset. Based on subcarrier 0 (SC=0) in slot 1, the reference signals of the first and second user equipments have frequency offsets of 0 and 1, respectively (based on reference signal of layer 1).

Referring to (c) of FIG. 17, both the first user equipment and the second user equipment have a rank value of 2. The reference signals of the first and second user equipments have a frequency interval of 4. Accordingly, the M factors of the first and second user equipments are commonly 4. However, the reference signals of the first and second user equipments are different from each other in their frequency offset. Based on subcarrier 0 (SC=0) in slot 1, the reference signals of the first and second user equipments have frequency offsets of 0 and 1, respectively (based on reference signal of layer 1).

FIG. 18A to FIG. 18D are diagrams illustrating examples of reference signals allocated with regard to each rank by a frequency division multiplexing (FDM) mode considering M factor in accordance with another embodiment of the present invention.

FIG. 18A to FIG. 18D are basically identical with FIG. 15A to FIG. 15D except that reference signals are allocated to two OFDM symbols per slot. Accordingly, for description of FIG. 18A to FIG. 18D, refer to the description of FIG. 15A to FIG. 15D. However, referring to M=4 of FIG. 18A, it is noted that when the M factor is 2, the reference signals are located in different subcarriers in l=1 and l=4 of slot 1 and cyclic-shifted in the frequency domain to obtain frequency diversity. It is also noted that the reference signals are located in different subcarriers of slot 1 and slot 2 and cyclic-shifted in the frequency domain to obtain frequency diversity. Namely, the reference signals can be staggered in a frequency direction within a slot or subframe as seen from FIG. 18B to FIG. 18D.

Figure 18A:
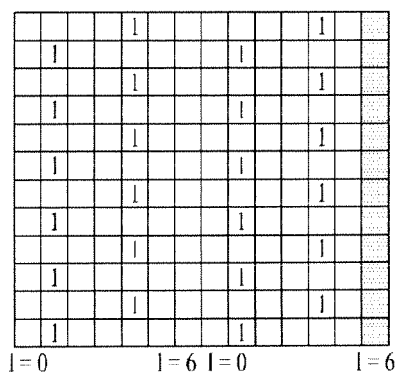
Figure 18A:
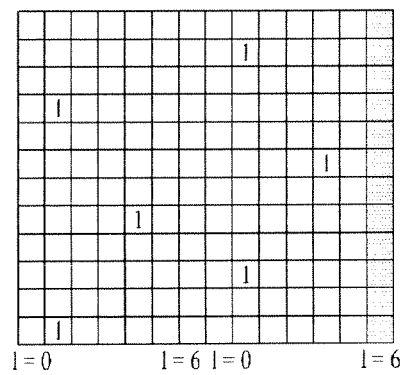
Figure 18B:
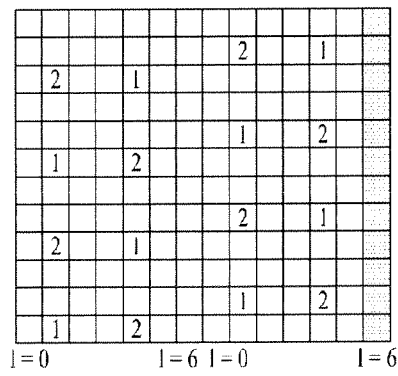
Figure 18B:
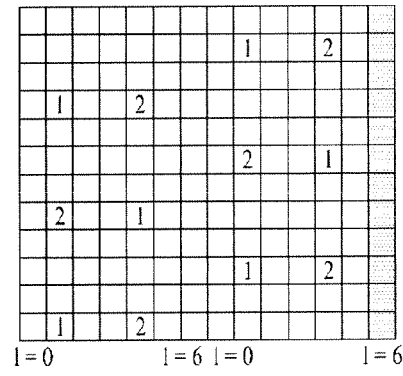
Figures 18C, 18D:
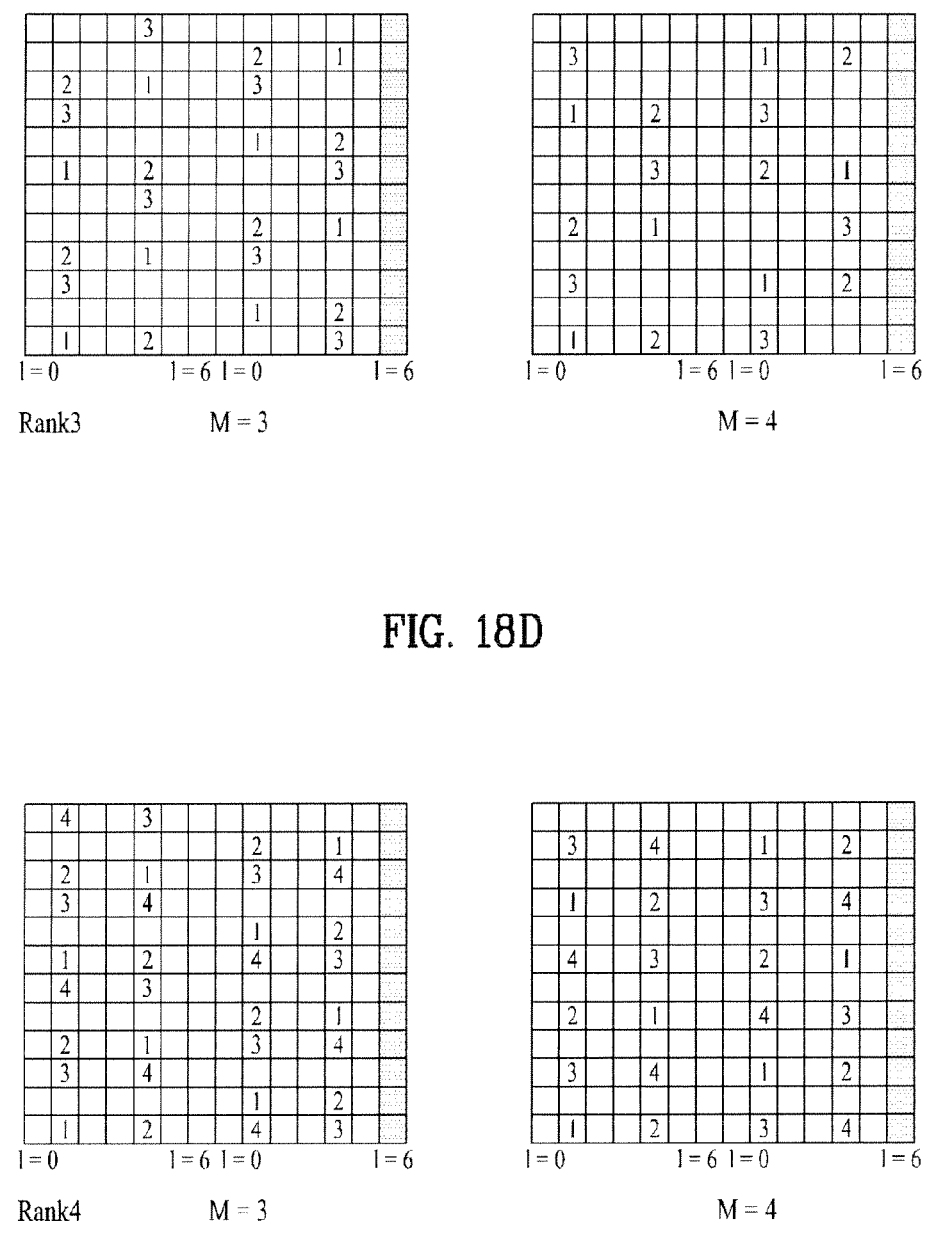

If the reference signals are staggered within a subframe, they are transmitted through four symbols so as not to overlap with one another on the frequency axis. In FIG. 18A, for understanding of the present invention, the reference signals are exemplarily cyclic-shifted in a frequency direction to obtain frequency diversity.

Accordingly, the locations of the symbols to which the reference signals are shifted within a subframe or slot can be varied depending on a communication environment under consideration. Also, the number of reference signals transmitted through two symbols l=1, 4 of slot 1 or slot 2 can be varied. Referring to FIG. 18A with M=4, two reference signals are transmitted through l=1, and one reference signal is transmitted through l=4. On the other hand, if one reference signal is transmitted through l=1, two reference signals can be transmitted through l=4. This is intended such that overhead does not exceed 15%.

Figure 19A:
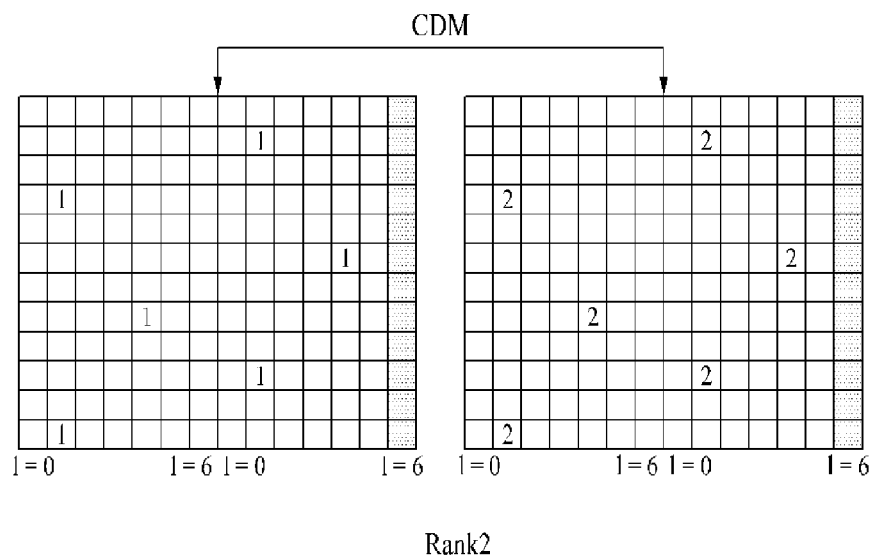
FIG. 19A and FIG. 19B are diagrams illustrating another examples of reference signals allocated with regard to each rank value by a code division multiplexing (CDM) mode considering M factor in accordance with another embodiment of the present invention.
Figure 19B:
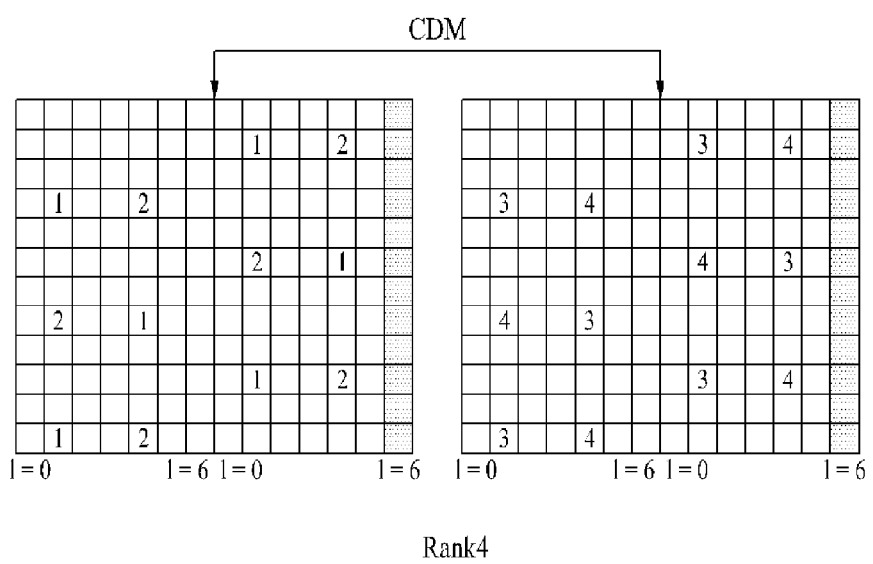

FIG. 19 is a diagram illustrating examples of reference signals allocated with regard to each rank by a code division multiplexing (CDM) mode considering M factor in accordance with another embodiment of the present invention.

FIG. 19 is basically identical with FIG. 16 except that reference signals are allocated to two OFDM symbols per slot. Accordingly, for description of FIG. 19, refer to the description of FIG. 16. However, referring to FIG. 19, it is noted that when a rank value is 2, the reference signals are located in different subcarriers in l=1 and l=4 of slot 1 and cyclic-shifted in the frequency domain to obtain frequency diversity. It is also noted that the reference signals are located in different subcarriers of slot 1 and slot 2 and cyclic-shifted in the frequency domain to obtain frequency diversity. Namely, the reference signals can be staggered in a frequency direction within a slot or subframe.

Figure 20:
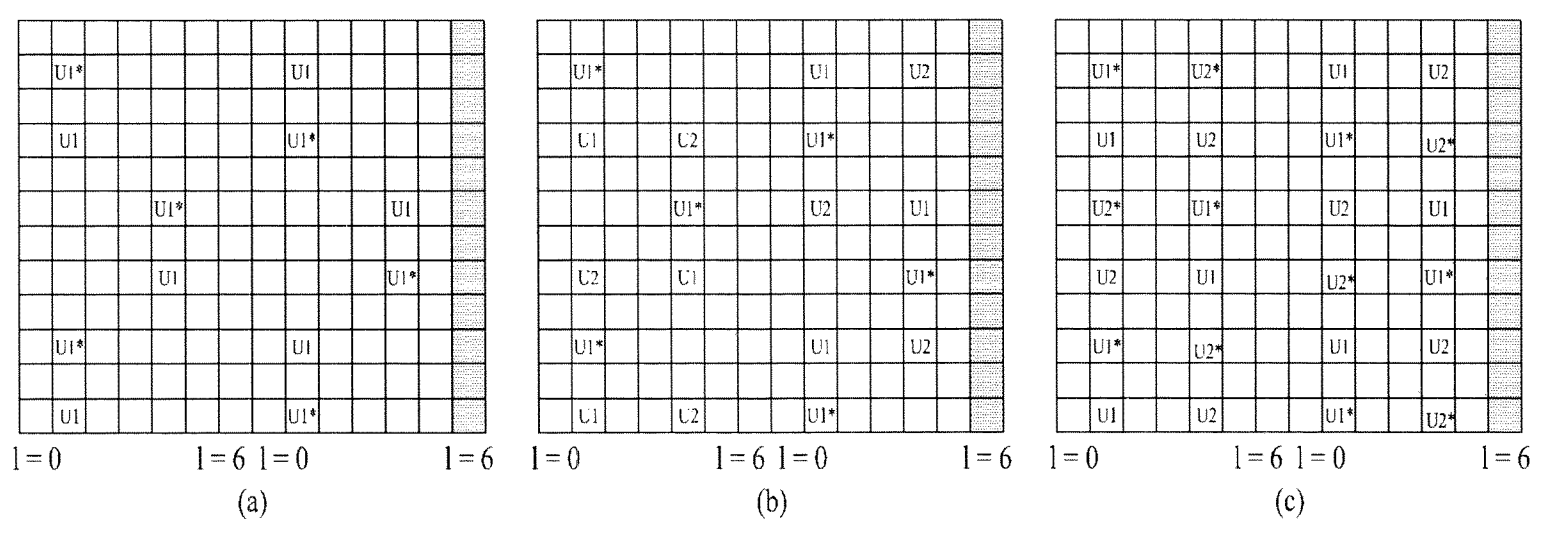

FIG. 20 is a diagram illustrating an example of reference signals allocated by a frequency division multiplexing (FDM) mode to implement MU MIMO in accordance with another embodiment of the present invention.

FIG. 20 is basically identical with FIG. 17 except that reference signals are allocated to two OFDM symbols per slot. Accordingly, for description of FIG. 20, refer to the description of FIG. 17. However, referring to FIG. 20, it is noted that the reference signals are located in different subcarriers in l=1 and l=4 of slot 1 and cyclic-shifted in the frequency domain to obtain frequency diversity. It is also noted that the reference signals are located in different subcarriers of slot 1 and slot 2 and cyclic-shifted in the frequency domain to obtain frequency diversity. Namely, the reference signals can be staggered in a frequency direction within a slot or subframe.

As described above, if the reference signals are transmitted using the frequency division multiplexing mode, the reference signals of slot 2 are cyclic-shifted in a frequency direction with regard to the reference signals of slot 1, whereby frequency offset is given to the reference signals between the two slots. The present invention suggests a hybrid method of the frequency division multiplexing method and the code division multiplexing method. According to the hybrid method, since a code region is additionally provided, code offset using code index is additionally suggested in addition to frequency offset using cyclic shift to the frequency axis. Namely, offset can additionally be given to the reference signals allocated to slot 1 and slot 2, by using combination of cyclic shift to the frequency axis and code index.

Figure 21:
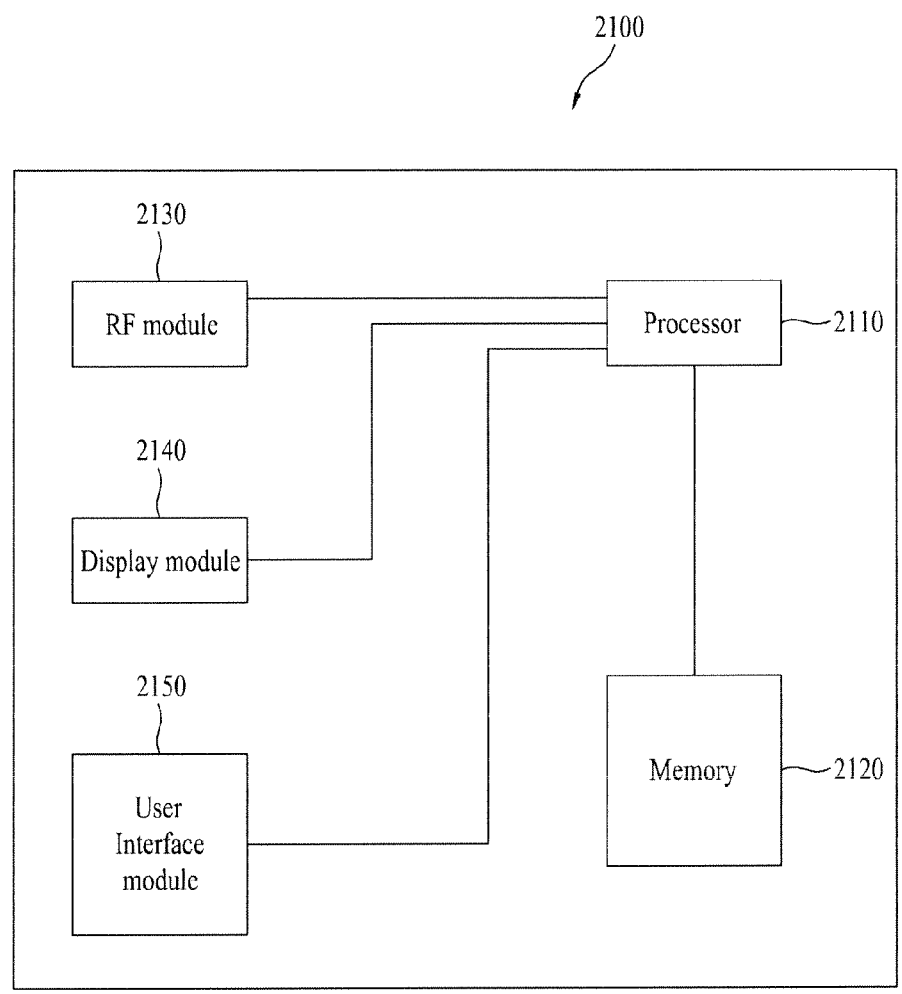
FIG. 21 is a view showing a transmitter or receiver according to an embodiment of the present invention.

FIG. 21 is a view showing a transmitter or receiver according to an embodiment of the present invention. The transmitter or the receiver may be a portion of a BS or a UE.

Referring to FIG. 21, the transmitter or receiver 2100 includes a processor 2110, a memory 2120, an RF module 2130, a display module 2140, and a user interface module 2150. The transmitter or receiver 2100 is shown for convenience of description and some modules may be omitted or added. In addition, the transmitter or receiver 2100 may further include necessary modules. In addition, in the transmitter or receiver 2100, some modules may be subdivided. The processor 2120 is configured to perform the operation according to the embodiments of the present invention shown in the drawings. The detailed operation of the process 2120 may refer to the contents described in FIGS. 1 to 20. The memory 2120 is connected to the processor 2110 and stores an operating system, an application, a program code and data. The RF module 2130 is connected to the processor 2110 and performs a function for converting a baseband signal into a radio-frequency signal or converting a radio-frequency signal into a baseband signal. For example, the RF module 2130 may perform analog conversion, amplification, filtering and frequency up-conversion or inverse processes thereof. The display module 2140 is connected to the processor 2110 and displays a variety of information. The display unit 2140 includes, but is not limited to, known devices such as a Liquid Crystal Display (LCD), a Light Emitting Diode (LED) and an Organic Light Emitting Diode (OLED). The user interface module 2150 is connected to the processor 2110 and may be configured by a combination of known user interfaces such as a keypad, a touch screen and the like.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The present invention can be applied to a method of performing communication in a wireless communication system. More specifically, the present invention can be applied to a method of transmitting reference signals through multiple antennas in a wireless communication system.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of transmitting uplink (UL) signals using a plurality of subcarriers by a user equipment (UE) in a wireless communication system, the method comprising:
   generating two or more UL demodulation reference signals (DMRSs) for two or more data layers including a first layer and a second layer;
   mapping the two or more UL DMRSs to resource elements (REs) on an UL subframe per antenna ports used for transmitting the two or more data layers,
   transmitting the two or more UL DMRSs,
   wherein when a rank is 3 or more, the two or more UL DMRSs are mapped non-continuously in a frequency domain, and are transmitted based on an orthogonal frequency division multiple access (OFDMA) scheme, and
   wherein when the rank is 2 or less, the two or more UL DMRSs are mapped continuously in the frequency domain, and are transmitted based on a single carrier-frequency division multiple access (SC-FDMA) scheme.

2. The method of claim 1, wherein the two or more UL DMRSs are staggered within the UL subframe or slot.

3. The method of claim 1,
   wherein a first UL DMRS for the first layer and a second UL DMRS for the second layer among the two or more UL DMRSs are mapped to a same set of REs based on a combination of code division multiplexing and frequency domain cyclic shifting, the two or more UL DMRSs mapped on only one predetermined symbol per the each slot, and
   wherein the same set of REs includes REs separated by N subcarriers per slot, and N is equal to 2, 3 or 4.

4. The method of claim 1, wherein the two or more UL DMRSs mapped on a predetermined symbol cover all subcarriers of one or more resource blocks.

5. The method of claim 1, wherein the two or more UL DMRSs are different from UL data and are precoded for UL multiple-input and multiple-output (MIMO).

6. A user equipment (UE) for transmitting uplink signals using a plurality of subcarriers in a wireless communication system, the UE comprising:
   a processor adapted to generate two or more UL demodulation reference signals (DMRSs) for two or more data layers including a first layer and a second layer, and to map the two or more UL DMRSs to resource elements (REs) on an UL subframe per antenna ports used for transmitting the two or more data layers; and
   a transmitter adapted to transmit the two or more UL DMRSs,
   wherein when a rank is 3 or more, the two or more UL DMRSs are mapped non-continuously in a frequency domain, and are transmitted based on an orthogonal frequency division multiple access (OFDMA) scheme, and
   wherein when the rank is 2 or less, the two or more UL DMRSs are mapped continuously in the frequency domain, and are transmitted based on a single carrier-frequency division multiple access (SC-FDMA) scheme.

7. The UE of claim 6, wherein the two or more UL DMRSs are staggered within the UL subframe or slot.

8. The UE of claim 6,
wherein a first UL DMRS for the first layer and a second UL DMRS for the second layer among the two or more UL DMRSs are mapped to a same set of REs based on a combination of code division multiplexing and frequency domain cyclic shifting, the two or more UL DMRSs mapped on only one predetermined symbol per the each slot, and
wherein the same set of REs includes REs separated by N subcarriers per slot, and N is equal to 2, 3 or 4.

9. The UE of claim 6, wherein the two or more UL DMRSs mapped on a predetermined symbol cover all subcarriers of one or more resource blocks.

\* \* \* \* \*